(12) United States Patent
Bellas et al.

(10) Patent No.: US 11,069,162 B1
(45) Date of Patent: *Jul. 20, 2021

(54) SYSTEM AND METHOD FOR GENERATING VEHICLE CRASH DATA

(71) Applicant: STATE FARM MUTUAL AUTOMOBILE INSURANCE COMPANY, Bloomington, IL (US)

(72) Inventors: Eric Bellas, Bloomington, IL (US); Shawn M. Call, Bloomington, IL (US); Gregory D. Carter, Bloomington, IL (US); Ronald R. Duehr, Normal, IL (US); Jeffrey David Hevrin, Bloomington, IL (US); Sara Elizabeth Collins, Pontiac, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/692,278

(22) Filed: Nov. 22, 2019

Related U.S. Application Data

(63) Continuation of application No. 16/439,693, filed on Jun. 12, 2019, which is a continuation of application
(Continued)

(51) Int. Cl.
*G07C 5/08* (2006.01)
*G07C 5/00* (2006.01)
*G06Q 40/08* (2012.01)

(52) U.S. Cl.
CPC .............. *G07C 5/085* (2013.01); *G06Q 40/08* (2013.01); *G07C 5/008* (2013.01)

(58) Field of Classification Search
CPC .............................. G07C 5/085; C06Q 40/08
See application file for complete search history.

(56) References Cited

U.S. PATENT DOCUMENTS 6,037,860 A 3/2000 Zander et al.
7,164,117 B2 1/2007 Breed et al.
(Continued)

OTHER PUBLICATIONS

U.S. Appl. No. 16/439,693, filed Jun. 12, 2019, Eric Bellas et al.
(Continued)

*Primary Examiner* — Jean Paul Cass
(74) *Attorney, Agent, or Firm* — Marshall, Gerstein & Borun LLP

(57) ABSTRACT

A computer-implemented method for generating vehicle crash data is presented. The method may include determining whether sensor data output of a sensor of a mobile computing device within a vehicle indicates that a crash of a vehicle has occurred. The method may further include displaying a notification prompting a user of the mobile computing device to confirm that the crash of the vehicle has occurred and receiving an indication from the user that the crash of the vehicle has occurred. Still further, the method may include transmitting the sensor data output to a remote computing device and receiving a communication from the remote computing device, wherein the communication prompts the user to take a post-crash action.

19 Claims, 9 Drawing Sheets

Related U.S. Application Data

No. 15/199,115, filed on Jun. 30, 2016, now Pat. No. 10,360,742.

(60) Provisional application No. 62/326,357, filed on Apr. 22, 2016.

(56) References Cited

U.S. PATENT DOCUMENTS

| | | | |
|---|---|---|---|
| 8,706,357 B1 | 4/2014 | van den Heuvel et al. | |
| 9,650,007 B1* | 5/2017 | Snyder | B60R 21/0132 |
| 9,767,625 B1* | 9/2017 | Snyder | G01P 15/0891 |
| 9,888,392 B1* | 2/2018 | Snyder | H04W 4/44 |
| 10,083,551 B1* | 9/2018 | Schmitt | G07C 5/085 |
| 10,360,742 B1 | 7/2019 | Bellas et al. | |
| 2003/0130984 A1 | 7/2003 | Quinlan et al. | |
| 2003/0152145 A1 | 8/2003 | Kawakita | |
| 2003/0217289 A1* | 11/2003 | Ammon | H04L 63/1416 |
| | | | 726/23 |
| 2005/0030224 A1* | 2/2005 | Koch | G07C 5/008 |
| | | | 342/357.31 |
| 2005/0046584 A1 | 3/2005 | Breed | |
| 2006/0208169 A1 | 9/2006 | Breed et al. | |
| 2007/0271387 A1 | 11/2007 | Lydon et al. | |
| 2009/0327815 A1 | 12/2009 | Sridharan et al. | |
| 2010/0016035 A1* | 1/2010 | Pullen | H04W 72/0446 |
| | | | 455/574 |
| 2010/0250615 A1 | 9/2010 | Reghetti et al. | |
| 2010/0251028 A1 | 9/2010 | Reghetti et al. | |
| 2012/0064855 A1* | 3/2012 | Mendelson | G06Q 90/20 |
| | | | 455/404.2 |
| 2014/0079044 A1* | 3/2014 | Ding | H04W 4/06 |
| | | | 370/338 |
| 2014/0122133 A1* | 5/2014 | Weisberg | G06Q 40/08 |
| | | | 705/4 |
| 2014/0269994 A1* | 9/2014 | HomChaudhuri | H04B 7/0874 |
| | | | 375/316 |
| 2014/0300739 A1* | 10/2014 | Mimar | G08B 21/06 |
| | | | 348/148 |
| 2014/0302869 A1* | 10/2014 | Rosenbaum | G01S 5/14 |
| | | | 455/456.1 |
| 2015/0080021 A1 | 3/2015 | Bietz et al. | |
| 2015/0084757 A1* | 3/2015 | Annibale | G08B 25/016 |
| | | | 340/436 |
| 2015/0341440 A1 | 11/2015 | Nelson et al. | |
| 2016/0007315 A1* | 1/2016 | Lundgreen | G01S 3/46 |
| | | | 455/67.11 |
| 2016/0094964 A1* | 3/2016 | Barfield, Jr. | G08B 25/016 |
| | | | 455/404.2 |
| 2017/0053461 A1* | 2/2017 | Pal | H04W 4/027 |
| 2018/0007587 A1* | 1/2018 | Feldman | H04L 65/1016 |
| 2018/0074161 A1* | 3/2018 | Rosenbaum | G01S 5/14 |
| 2018/0165554 A1* | 6/2018 | Zhang | G06K 9/6256 |

OTHER PUBLICATIONS

Wikipedia, Bluetooth Low Energy Beacon, downloaded from the Internet at: <https://en.wikipedia.org/wiki/Bluetooth_low_energy_beacon> (downloaded Jan. 29, 2020).

* cited by examiner

SYSTEM AND METHOD FOR GENERATING VEHICLE CRASH DATA

CROSS-REFERENCE TO RELATED APPLICATION

This application is a continuation of U.S. patent application Ser. No. 16/439,693 filed Jun. 12, 2019 which is a continuation of U.S. patent application Ser. No. 15/199,115 filed Jun. 30, 2016, which claims benefit of U.S. Provisional Application No. 62/326,357 filed Apr. 22, 2016, both of which the entire contents thereof are incorporated herein by reference in their entireties.

FIELD OF THE DISCLOSURE

The present disclosure generally relates to vehicle crash data and, more particularly, to a system and method for generating vehicle crash data.

BACKGROUND

A vehicle may include one or more sensors that may be a part of a computing device or operate in conjunction with a computing device to facilitate crash detection when the vehicle is traveling. In some cases, the computing device may be a smart phone and the one or more sensors may operate in conjunction with an app installed and executing on the smart phone to facilitate crash detection. However, current uses of sensors and apps to detect vehicle crashes have several drawbacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for generating vehicle crash data may be provided. The method may include determining, using one or more processors, whether a first mobile computing device within a vehicle has detected that a crash of the vehicle has occurred. The method may also include determining, using the one or more processors, whether at least a second mobile computing device within the vehicle has detected that the crash of the vehicle has occurred. The method may additionally include receiving, using the one or more processors, sensor data output by at least one sensor when it is determined that at least one of the first mobile computing device or the at least the second mobile computing device has detected that the crash of the vehicle has occurred. The at least one sensor may be at least one sensor of at least one of the first mobile computing device or the at least the second mobile computing device, and the sensor data output by the at least one sensor of the at least one of the first mobile computing device or the at least the second mobile computing device may be associated with the detected crash of the vehicle. The method may further include generating, using the one or more processors, based on the sensor data associated with the detected crash of the vehicle, vehicle crash data. The vehicle crash data may include at least one of an initial confirmation that the crash of the vehicle has occurred, an indication of a severity of the crash of the vehicle, an indication of a number of occupants of the vehicle at a time of the crash, or an indication that the crash of the vehicle has not occurred.

In another embodiment, a computing system for generating vehicle crash data may be provided. The computing system may include a first mobile computing device within a vehicle and at least a second mobile computing device within the vehicle. The first mobile computing device may be configured to detect whether a crash of the vehicle has occurred. The first mobile computing device may also be configured to determine whether the at least the second mobile computing device has detected that the crash of the vehicle has occurred. The first mobile computing device may additionally be configured to analyze sensor data output by at least one sensor when it is determined that at least one of the first mobile computing device or the at least the second mobile computing device has detected that the crash of the vehicle has occurred. The at least one sensor may be at least one sensor of at least one of the first mobile computing device or the at least the second mobile computing device, and the sensor data output by the at least one sensor of the at least one of the first mobile computing device or the at least the second mobile computing device may be associated with the detected crash of the vehicle. Vehicle crash data may be generated based on the analyzing of the sensor data associated with the detected crash of the vehicle. The vehicle crash data may include at least one of an initial confirmation that the crash of the vehicle has occurred, an indication of a severity of the crash of the vehicle, an indication of a number of occupants of the vehicle at a time of the crash, or an indication that the crash of the vehicle has not occurred.

In yet another embodiment, a computer readable storage medium may be provided that includes non-transitory computer readable instructions stored thereon for generating vehicle crash data. The instructions, when executed on one or more processors, may cause the one or more processors to determine whether a first mobile computing device within a vehicle has detected that a crash of the vehicle has occurred. The instructions, when executed on the one or more processors, may also cause the one or more processors to determine whether at least a second mobile computing device within the vehicle has detected that the crash of the vehicle has occurred. The instructions, when executed on the one or more processors, may additionally cause the one or more processors to receive sensor data output by at least one sensor when it is determined that at least one of the first mobile computing device or the at least the second mobile computing device has detected that the crash of the vehicle has occurred. The at least one sensor may be at least one sensor of at least one of the first mobile computing device or the at least the second mobile computing device, and the sensor data output by the at least one sensor of the at least one of the first mobile computing device or the at least the second mobile computing device may be associated with the detected crash of the vehicle. The instructions, when executed on the one or more processors, may further cause the one or more processors to generate, based on the sensor data associated with the detected crash of the vehicle, vehicle crash data. The vehicle crash data may include at least one of an initial confirmation that the crash of the vehicle has occurred, an indication of a severity of the crash of the vehicle, an indication of a number of occupants of the vehicle at a time of the crash, or an indication that the crash of the vehicle has not occurred.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

I. EXAMPLE SYSTEM AND RELATED FUNCTIONALITY

Figure 1:
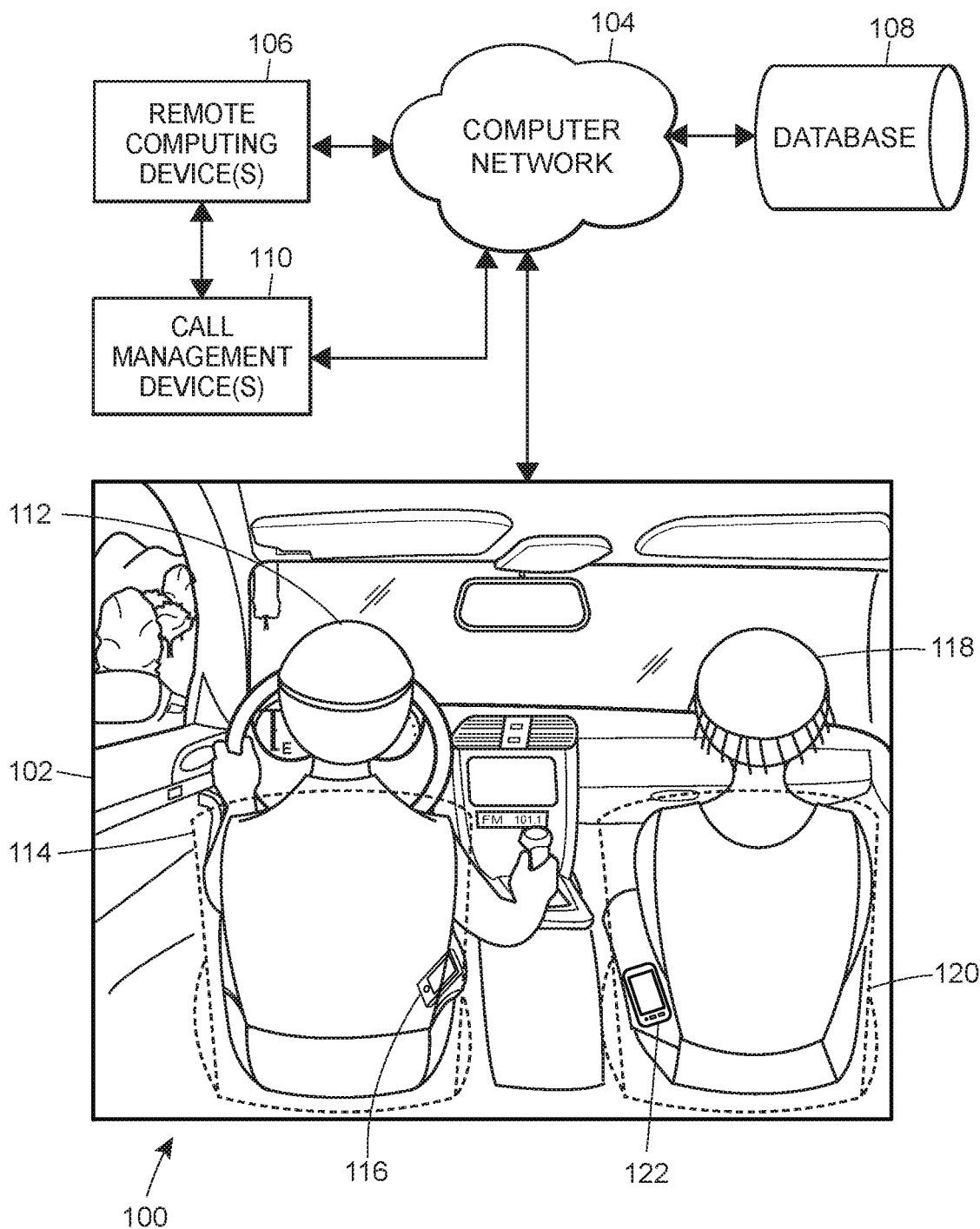
FIG. 1 illustrates an example system for generating vehicle crash data.

FIG. 1 illustrates an example system 100 for generating vehicle crash data, such as an indication of whether a vehicle crash has occurred. The example system 100 may include a vehicle 102 (only a portion of which is shown in FIG. 1 for ease of illustration and explanation), a computer network 104, a remote computing device(s) 106, a database 108 or other data storage mechanism (e.g., one or more hard disk drives, optical storage drives, solid state storage devices, etc.), and call management device(s) 110. As shown in FIG. 1 and described in further detail below, each of the vehicle 102, the remote computing device(s) 106, the database 108, and the call management device(s) 110 may be communicatively coupled to the computer network 104. In other embodiments, various ones of the elements of the example system 100 may be communicatively coupled to one another in a manner other than via the computer network 104. By way of example, the remote computing device(s) 106 may be directly coupled to the call management device(s) 110 through a dedicated wired or wireless link (as shown in FIG. 1), and/or may be directly coupled to the database 108 through a dedicated wired or wireless link (not shown in FIG. 1). As in other examples shown and described herein, singular and/or plural instances of various elements may be shown and described as such for ease of illustration and explanation. Thus, for example, the example system 100 may include a number of vehicles 102 with parties therein that are insured by an insurance provider, and any suitable number of remote computing device(s) 106, databases 108, and call management device(s) 110.

The computer network 104 may be a computer network of an insurance provider (e.g., provided or used by the insurance provider, or communications over which the insurance provider otherwise controls or facilitates). In various embodiments, as further described below, processors of the remote computing device(s) 106, the call management device(s) 110, and/or devices in the vehicle 102 may execute instructions to transmit data to, receive data from, or otherwise communicate with one another and/or the database 108, for example, via the computer network 104. The computer network 104 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 104 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As shown in the example system 100, the vehicle 102 includes a driver 112 seated in a driver seat 114 and associated with (e.g., owning and/or possessing) a first mobile computing device 116, such as a smart phone. The vehicle 102 may also include a front passenger 118 seated in a front passenger seat 120 and associated with a second mobile computing device 122, such as another smart phone. While various examples herein describe computing devices such as the first mobile computing device 116 and/or the second mobile computing device 122 as smart phones, it will be understood by one of ordinary skill in the art in light of the teaching and disclosure herein that each of the computing devices referred to herein may be any suitable computing device. For example, each of the computing devices referred to herein may be implemented as a desktop computer, a laptop computer, a mobile phone such as a smart phone, a tablet, a phablet, smart glasses, other wearable computing device(s), etc.

As further described below, the remote computing device(s) 106 (e.g., an insurance provider server(s)) and/or a device(s) in the vehicle 102, such as the first mobile computing device 116 and/or the second mobile computing device 122, may be used in generating an indication of whether a vehicle crash has occurred, such as a crash of the vehicle 102. In various embodiments, as further described below, the first mobile computing device 116 and/or the second mobile computing device 122, for example, may include one or more sensors that may output sensor data indicative of whether a crash of the vehicle 102 has occurred. For example, each of the first mobile computing device 116 and the second mobile computing device 122 may include one or more of an accelerometer, a pressure sensor (e.g., a barometric pressure sensor), a gyroscope, a magnetometer, or a sound monitoring component (e.g., a microphone or other suitable sound monitoring component). In some embodiments, as further described below, the one or more sensors may output sensor data indicating that a condition corresponding to a crash of the vehicle 102 has occurred (e.g., indicating that an amount of acceleration corresponding to a crash of the vehicle 102 has been sensed), and further sensor data may then be output and used to generate an indication of whether the crash of the vehicle 102 has occurred.

The first mobile computing device 116, the second mobile computing device 122, and/or the remote computing device(s) 106 may also or alternatively be used in generating, for example, an indication of a severity of the crash of the vehicle 102, a location of the vehicle 102 at a time of the crash of the vehicle 102, the time of the crash of the vehicle 102, a speed of the vehicle 102 at the time of the crash of the vehicle 102, a number of occupants of the vehicle 102 at the time of the crash of the vehicle 102, and/or a Delta-V associated with the crash of the vehicle 102, as further described below. Such data regarding the crash of the vehicle 102 may be provided to and/or used by the insurance provider (e.g., at the call management device(s) 110), where the insurance provider may provide insurance coverage with respect to the vehicle 102 and an insured party or parties (e.g., a user(s) of the first mobile computing device 116 and/or the second mobile computing device 122, such as the driver 112 and/or the front passenger 118), as further described herein. In some embodiments, such data regarding the crash of the vehicle 102 may be stored in the database 108 for retrieval by, for example, the remote computing device(s) 106 when, for example, an insured party calls the insurance provider to initiate a claim associated with the crash, electronically initiates a claim with the insurance provider, etc.

The call management device(s) 110 may include any suitable device or devices at, for example, a call center (e.g., claim center) of the insurance provider to receive, place, and otherwise process telephone calls, for example. For example, the call management device(s) 110 may include one or more telephones; one or more computing devices communicatively coupled to the telephones and, for example, communicatively coupled to the computer network 104 and/or the remote computing device(s) 106; etc. As such, an incoming call to the insurance provider (e.g., to initiate a claim associated with a crash of the vehicle 102) may be received and processed using the call management device(s) 110 in conjunction with, for example, information received at the call management device(s) 110 from the remote computing device(s) 106, as further described below.

Still further, as also further described below, the first mobile computing device 116 and/or the second mobile computing device 122, for example, may be used in generating sensor data (e.g., from one or more sensors included in the first mobile computing device 116 and/or the second mobile computing device 122, as described above) corresponding to a period of time before the crash of the vehicle 102 and sensor data corresponding to a period of time after the crash of the vehicle 102. The sensor data corresponding to the periods of time before and after the crash of the vehicle 102 may be collected by a buffer(s) of the first mobile computing device 116 and/or the second mobile computing device 122, and may then be stored in additional data storage of the first mobile computing device 116 and/or the second mobile computing device 122.

As further discussed below, one or more additional mobile computing devices may be present in the vehicle 102 (e.g., in rear seats of the vehicle 102, as further discussed with respect to, for example, FIG. 5), and may be used in performing actions such as those described above and discussed in further detail below. Moreover, while mobile computing devices such as the first mobile computing device 116 and the second mobile computing device 122 are shown and described as being associated with (e.g., possessed by a user sitting in) particular seats of the vehicle 102, the various computing devices described herein may have different associations with seats of the vehicle 102; may not be associated with any particular seat; one or more seats may not have an associated computing device; etc.

II. EXAMPLE COMPUTING DEVICE

Figure 2:
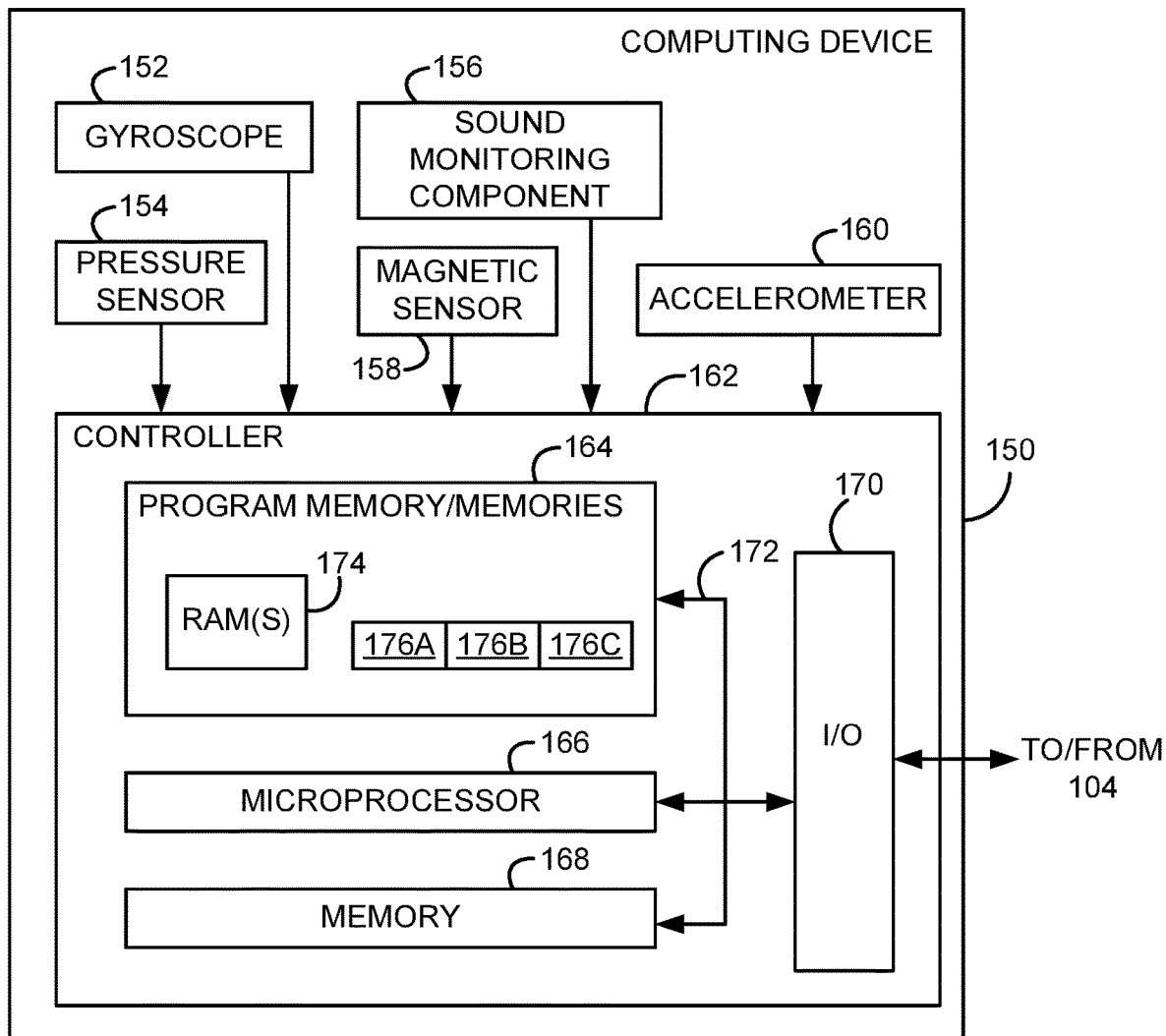
FIG. 2 illustrates an example computing device that may be an implementation of one or more computing devices described elsewhere herein, and illustrates components thereof.

FIG. 2 illustrates an example computing device 150 and components thereof. An instance or instances of the computing device 150, or portions thereof, may be an implementation(s) of, for example, one or more of one or more of the remote computing device(s) 106, one or more of the call management device(s) 110, the first mobile computing device 116, or the second mobile computing device 122. The computing device 150 may include sensors, such as when the computing device 150 is an implementation of the first mobile computing device 116 or the second mobile computing device 122. More particularly, the sensors may include, for example, a gyroscope 152, a pressure sensor 154 (e.g., a barometric pressure sensor), a sound monitoring component 156 (e.g., a microphone), a magnetic sensor 158 (e.g., a magnetometer), and an accelerometer 160. As with other components shown in the figures and described herein, any suitable number of each of the sensors 152-160 may be included in a particular implementation of one of the computing devices described herein, and/or one or more of the sensors 152-160 may be omitted in a particular implementation of one of the computing devices described herein.

The computing device 150 may include a controller 162. The controller 162 may include a program memory 164, a microcontroller or a microprocessor 166, a memory 168, and an input/output (I/O) circuit 170, all of which may be interconnected via an address/data bus 172. The program memory 164 may store computer-executable instructions, which may be executed by the microprocessor 166. The memory 168 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and/or other suitable form(s) of memory.

It should be appreciated that although FIG. 2 depicts only one microprocessor 166, the controller 162 may include multiple microprocessors 166. Similarly, the program memory 164 of the controller 162 may include additional RAM(s) 174 and multiple program memories 176A, 176B and/or 176C (or any suitable number of multiple program memories) storing one or more corresponding modules, routines, and/or instructions, etc. used in, for example, generating vehicle crash data, according to the particular configuration of the controller 162 and the computing device 150. Additionally, although FIG. 2 depicts the I/O circuit 170 as a single block, the I/O circuit 170 may include a number of different types of I/O circuits (not depicted). The RAM(s) 174 and the program memory/memories 176A, 176B and/or 176C may be implemented in any known form of non-transitory computer readable storage media, including but not limited to semiconductor memories, magnetically readable memories, and/or optically readable memories. It should also be appreciated that the computing device 150 may include additional, fewer, or alternate components, such as depending on a particular device described herein of which the computing device 150 is an implementation.

III. EXAMPLE METHOD FOR GENERATING INDICATION OF WHETHER VEHICLE CRASH HAS OCCURRED

Figure 3:
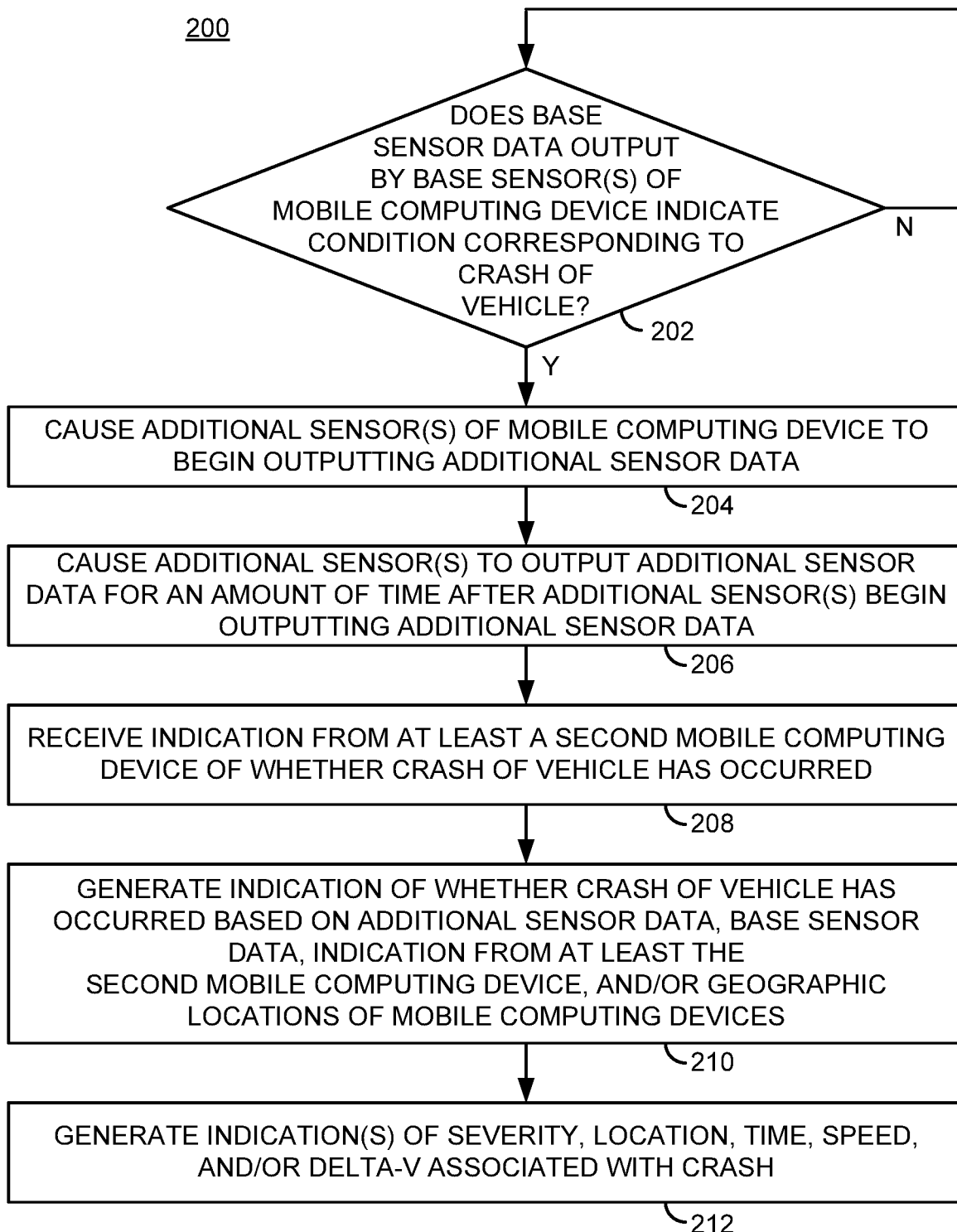
FIG. 3 is a flow chart of an example method, routine, or process for generating an indication of whether a vehicle crash has occurred.

FIG. 3 is a flow chart of an example method, routine, or process 200 for generating an indication of whether a vehicle crash has occurred, such as a crash of the vehicle 102. One or more processors, which may be one or more processors of the first mobile computing device 116, such as a microprocessor(s) implemented as described above with respect to FIG. 2, may determine whether base sensor data output by one or more base sensors of a mobile computing device indicates that a condition corresponding to a crash of the vehicle 102 has occurred (block 202). The mobile computing device may be, for example, the first mobile computing device 116, and the one or more processors (which may be one or more processors of the first mobile computing device 116, as noted above) may perform the determination described with respect to block 202 by receiving base sensor data from the base sensor(s) of the first mobile computing device 116 when the first mobile computing device 116 is present within the vehicle 102. For example, the first mobile computing device 116 may be a smart phone of, or otherwise possessed by or in the control of, the driver 112. In another embodiment, the one or more processors may be one or more processors of the second mobile computing device 122, and/or the mobile computing device including the base sensor(s) may be the second mobile computing device 122.

The one or more processors may perform the actions described with respect to block 202, and the actions described with respect to other blocks herein, by executing computer-executable instructions stored in, for example, one or more program memories such as the program memories 176A, 176B, and/or 176C when the computing device 150 is an implementation of a mobile computing device that includes the one or more processors and one or more program memories. The computer-executable instructions executed by the one or more processors to perform actions described herein may constitute, for example, one or more smart phone apps used for crash detection and post-crash actions as further discussed below. Such an app(s) may be provided by the insurance provider and made available to a user (e.g., insured party) for download to the first mobile computing device 116

With further reference to the actions described with respect to block 202, in one embodiment, the one or more base sensors may include the accelerometer 160, and the base sensor data may be or may include acceleration data output by the accelerometer 160. The determination of whether the base sensor data output by the one or more base sensors indicates that a condition corresponding to a crash of the vehicle 102 has occurred may be or may include a determination of whether an amount of acceleration indicated by the accelerometer 160 is at least a certain number of "g" s. For example, if the amount of acceleration indicated by the accelerometer 160 is equal to or greater than such a certain number or threshold number of "g" s, such an indication by the accelerometer 160 may be an indication of a condition corresponding to a crash of the vehicle 102, because the vehicle 102 may be more likely to experience a high magnitude of acceleration (e.g., a sudden stop) in the event of a crash.

With continued reference to the actions described with respect to block 202, a suitable sensor or sensors other than or in addition to the accelerometer 160 may be or may be included in the one or more base sensors and may output the base sensor data or a portion(s) thereof. As just one example, the gyroscope 152 may be included in the base sensor(s), and an output from the gyroscope 152 that is equal to or greater than a predetermined number of radians per second may indicate that a condition corresponding to a crash of the vehicle 102 has occurred, for example.

If it is determined with respect to block 202 that the base sensor data indicates that a condition corresponding to a crash of the vehicle 102 has not occurred, the example method, routine, or process 200 may remain at the determination described with respect to block 202 until it is determined that the base sensor data indicates that a condition corresponding to a crash of the vehicle 102 has occurred.

If it is determined that the base sensor data indicates that a condition corresponding to a crash of the vehicle 102 has occurred, the one or more processors (e.g., one or more processors of the first mobile computing device 116, as described above) may cause at least one additional sensor of the mobile computing device (e.g., the first mobile computing device 116) to begin outputting additional sensor data (block 204). For example, where the base sensor(s) is the accelerometer 160, the one or more processors may cause one or more of the gyroscope 152, the pressure sensor 154, the magnetic sensor 156, or the sound monitoring component 158 to turn on or otherwise activate or begin operation, and thereby begin outputting additional sensor data. In this manner, the accelerometer 160 or other suitable base sensor(s) may advantageously be used to determine whether a condition corresponding to a crash of the vehicle 102 has occurred without having to use all sensors of the mobile computing device (e.g., the first mobile computing device 116). When such a condition (e.g., which may correspond to particular output(s) of the base sensor(s) as discussed above) has occurred, the additional sensor(s) may be caused to output the additional sensor data in order to increase the accuracy of an indication of whether a crash of the vehicle 102 has occurred, with such an indication being further discussed below.

For example, the additional sensor(s) may increase the accuracy of an indication of whether a crash has occurred by providing additional data, and/or by providing data where the base sensor(s) may not be able to provide sufficiently accurate outputs. As one example, where the base sensor(s) includes the accelerometer 160, the accelerometer 160 may in some mobile computing devices, such as the first mobile computing device 116, be limited in the number of "g"s that can be detected and outputted by the accelerometer 160. Accordingly, use of the additional sensor(s) in such an example may improve the accuracy of an indication of whether a crash has occurred. It will be appreciated in light of the teaching and disclosure herein that power consumption by, for example, the first mobile computing device 116 may advantageously be reduced by not operating the additional sensor(s) unless a condition corresponding to a crash has occurred.

The one or more processors may cause the at least one additional sensor of the first mobile computing device 116 (or other suitable mobile computing device, as discussed herein) to output the additional sensor data for an amount of time (e.g., a predetermined amount of time) after the at least one additional sensor begins outputting the additional sensor data (block 206). The amount of time may be, for example, a predetermined amount of time that corresponds to an expected duration of a crash of the vehicle 102. For example, the insurance provider may have determined that a typical vehicle crash has a duration of less than three-tenths of a second, and the app used to perform actions described herein (such an app being discussed above) may thus cause the first mobile computing device 116, and more particularly the one or more processors thereof, to cause the at least one additional sensor to output the additional sensor data for three-tenths of a second. It will be appreciated any other suitable time may be used as the amount of time during which the at least one additional sensor is caused to output the additional sensor data, and that the app may be configured (e.g., by the insurance provider) accordingly.

Figure 5:
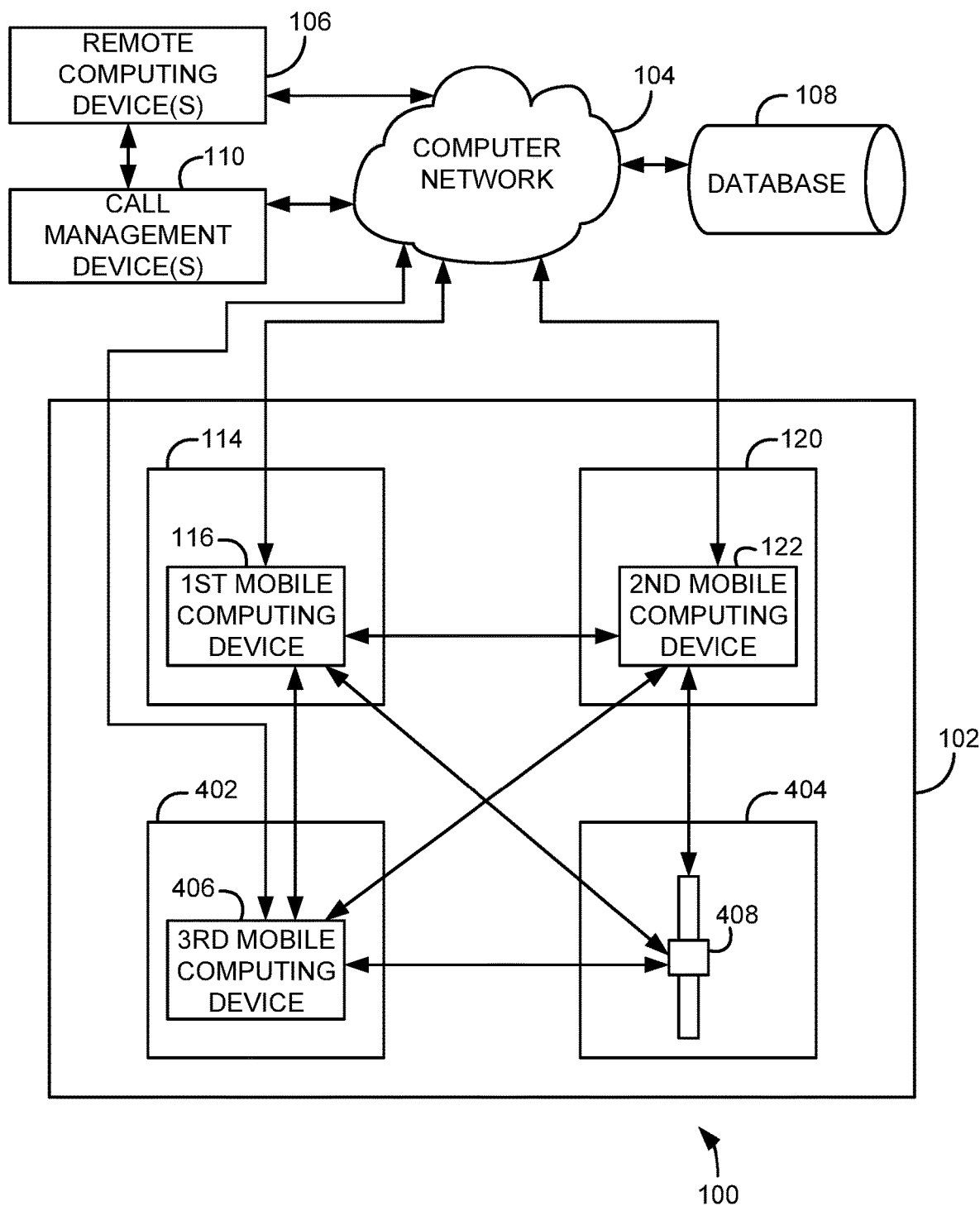
FIG. 5 illustrates the example system of FIG. 1 for generating vehicle crash data in greater detail.

The one or more processors may receive an indication from at least a second mobile computing device (e.g., the second mobile computing device 122 and/or an additional mobile computing device(s) such as one of the additional mobile computing device(s) further discussed with respect to FIG. 5) of whether the crash of the vehicle 102 has occurred, where the at least the second mobile computing device may be located within the vehicle 102 (block 208). The indication from the at least the second mobile computing device of whether the crash of the vehicle 102 has occurred may be determined by the at least the second mobile computing device in any suitable manner. In some embodiments, the indication from the at least the second mobile computing device of whether the crash of the vehicle 102 has occurred may be or may include further sensor data from at least one sensor of the at least the second mobile computing device. For example, at least one sensor of the at least the second mobile computing device, such as at least one sensor of one of the types of sensors 152-160 shown and described with respect to FIG. 2, may output sensor data that may indicate whether a crash of the vehicle 102 has occurred, and this sensor data may be received using the one or more processors of the first mobile computing device 116.

The sensor data received from the at least the second mobile computing device using the one or more processors of the first mobile computing device 116 may, for example, be used in conjunction with the base sensor data and the additional sensor data described above to generate an indication of whether the crash of the vehicle 102 has occurred, as further described below. In some embodiments, the sensor data received from the at least the second mobile computing device may include at least second base sensor data and/or at least second additional sensor data. The at least second base sensor data and/or the at least second additional sensor data may be received, for example, where one or more of the at least the second mobile computing device uses a base sensor(s) to determine whether a condition corresponding to a crash of the vehicle 102 has occurred and uses an additional sensor(s) to output additional sensor data in a manner similar to that described with respect to the first mobile computing device 116.

With continued reference to the actions described with respect to block 208, in another example, one or more processors of the at least the second mobile computing device may perform actions similar to those described above with respect to blocks 202, 204, and 206, and may analyze resulting base sensor data and additional sensor data output by sensors of the at least the second mobile computing device. The one or more processors of the at least the second mobile computing device may thus determine the indication that is received using the one or more processors of the first mobile computing device 116, as described with respect to block 208, based on an analysis of such sensor data from the at least the second mobile computing device. In this example, the indication received as described with respect to block 208 may not include all or a portion of such sensor data from the at least the second mobile computing device, but instead may include data resulting from an analysis of such sensor data.

In a further example, the one or more processors of the at least the second mobile computing device may analyze sensor data from any suitable sensor or sensors, such as the sensors shown and described with respect to FIG. 2, in order to determine the indication from the at least the second mobile computing device of whether the crash of the vehicle 102 has occurred. In such an example, the at least the second mobile computing device need not use one or more base sensors and need not cause at least one additional sensor to begin outputting additional sensor data in the same manner as described with respect to the first mobile computing device 116. For example, the one or more processors of the at least the second mobile computing device may cause any suitable sensor or sensors of the at least the second mobile computing device (such as one or more of the types of sensors 152-160) to operate concurrently and to output sensor data that may be analyzed to determine the indication from the at least the second mobile computing device of whether the crash of the vehicle 102 has occurred.

The one or more processors may generate an indication of whether the crash of the vehicle 102 has occurred (block 210). In various embodiments, the one or more processors may generate the indication of whether the crash of the vehicle 102 has occurred based on one or more of the additional sensor data caused to be outputted as described with respect to blocks 204 and 206; the base sensor data; the indication from the at least the second mobile computing device of whether the crash of the vehicle 102 has occurred; a geographic location(s) of each of the first mobile computing device 116 and/or the at least the second mobile computing device; and/or any other suitable factors. For example, the indication of whether the crash has occurred may be based on factors such as whether the additional sensor data includes an output of the gyroscope 152 that is more than a particular (e.g., predetermined) number of radians per second; whether the additional sensor data includes a change in an output of the pressure sensor 154 that is more than a particular number of millibars; whether the additional sensor data includes a change in an output of the sound monitoring component 156 that is more than a particular number of decibels; whether the additional sensor data includes a change in an output of the magnetic sensor 158 that is more than a particular amount; and/or any other suitable factor(s).

When the indication of whether the crash of the vehicle 102 has occurred is an indication that the crash of the vehicle 102 has occurred, a notification and/or prompt may be displayed to a user of the first mobile computing device 116 and/or to a user(s) of the at least the second mobile computing device (e.g., a user(s) of the second mobile computing device 122 and/or an additional mobile computing device(s) such as those discussed with respect to FIG. 5), as further discussed below. When the indication of whether the crash of the vehicle 102 has occurred is an indication that the crash of the vehicle 102 has not occurred, the one or more processors may cause the app to, for example, adjust the manner of analysis of the base sensor data so as to prevent "false alarms" in which the base sensor data indicates a condition corresponding to a crash when a crash has not actually occurred. For example, the one or more processors may implement a machine learning process and/or other suitable techniques to make such an adjustment(s). Additionally or alternatively, when the indication of whether the crash of the vehicle 102 has occurred is an indication that the crash of the vehicle 102 has not occurred, the one or more processors may cause the app to, for example, adjust the manner of analysis of the base and/or additional sensor data from the base and/or additional sensors of the first mobile computing device 116 in conjunction with sensor data from the at least the second mobile computing device, such as by way of a machine learning process.

The one or more processors may generate at least one of an indication of a severity of the crash of the vehicle 102, an indication of a location of the vehicle 102 at a time of the crash of the vehicle, an indication of the time of the crash of the vehicle 102, an indication of a speed of the vehicle 102 at the time of the crash, or an indication of a Delta-V associated with the crash of the vehicle 102 (block 212). The indication(s) generated as described with respect to block 212 may be generated based on, for example, the base sensor data output by the at least one base sensor of the first mobile computing device 116 and/or based on, for example, the additional sensor data output by the at least one additional sensor of the first mobile computing device 116. In some embodiments, the indication(s) generated as described with respect to block 212 may be generated further based on, for example, the aforementioned indication from the at least the second mobile computing device of whether the crash of the vehicle 102 has occurred (which indication may be or include, for example, sensor data or another suitable indication as described above with respect to block 208).

The indication of the Delta-V associated with the crash of the vehicle 102 may be an indication of Delta-V as used in vehicle crash analysis, and thus may be an indication of the difference between the velocity of the vehicle 102 before and after the crash of the vehicle 102. Higher values of Delta-V may, for example, indicate higher vehicle crash severities, higher likelihoods of injuries in vehicle crashes, etc.

Furthermore, in some embodiments, the actions described with respect to block 212 may also or alternatively include generating one or more other suitable indications, such as, for example, an indication of a number of occupants of the vehicle 102 at the time of the crash. The indication of the number of occupants of the vehicle 102 at the time of the crash may be generated based on, for example, the one or more processors of the first mobile computing device 116 causing the first mobile computing device 116 to operate in a beacon receive mode to receive a signal or signals from an additional mobile computing device(s) that may operate in a beacon transmit mode. The signal(s) received from the additional mobile computing device(s) may include, for example, one or more indication(s) from the additional mobile computing device(s) that a crash of the vehicle 102 has occurred. The additional mobile computing device(s) may transmit BLUETOOTH® signals, for example. The low power of BLUETOOTH® signals may allow an assumption that any BLUETOOTH® signal received by the first mobile computing device 116 from an additional mobile computing device is received from an additional mobile computing device that is located within the vehicle 102, and thus associated with an occupant of the vehicle 102. In this manner, the indication of the number of occupants of the vehicle 102 may be determined. It will be appreciated, however, that any suitable type(s) of signal(s) may be transmitted by the additional mobile computing device(s). Additionally, the indication of the number of occupants of the vehicle 102 may be determined in any suitable manner and need not utilize, for example, the beacon transmit and beacon receive mode features described herein.

Additionally or alternatively, the signal(s) transmitted by the additional mobile computing device(s) (e.g., BLUETOOTH® signals) may include location information of the additional mobile computing device(s), such as Global Positioning System (GPS) information. For example, the aforementioned app for crash detection, as installed on each of the additional mobile computing device(s), may cause each of the additional mobile computing device(s) to transmit such location information, which location information may be received using the one or more processors of the first mobile computing device 116. Such location information may be compared, such as using the one or more processors of the first mobile computing device 116, with location information of the first mobile computing device 116 to determine whether the additional mobile computing device(s) are within the vehicle 102 and associated with additional occupant(s) of the vehicle 102.

With continued reference to the actions described with respect to block 212, and with particular reference to the aforementioned beacon receive and beacon transmit modes, in one embodiment, the aforementioned app for crash detection may be installed on the first mobile computing device 116 and each of the additional mobile computing device(s) (e.g., the second mobile computing device 122 and/or other mobile computing device(s) such as those discussed with respect to FIG. 5). The app may be configured such that when the one or more processors of the first mobile computing device 116 determine that the base sensor data indicates that a condition corresponding to a crash of the vehicle 102 has occurred, the first mobile computing device 116 is caused to operate in the beacon receive mode. The app for crash detection may also be configured such that when the first mobile computing device 116 is caused to operate in the beacon receive mode, the additional mobile computing device(s) are caused to operate or remain operating in the beacon transmit mode.

More particularly, in one embodiment, the app may be configured to cause the one or more processors of the first mobile computing device 116 to cause the first mobile computing device 116 to transmit a signal to the additional mobile computing device(s) indicating that the base sensor data of the first mobile computing device 116 indicates that a condition corresponding to a crash has occurred. When the first mobile computing device 116 transmits such a signal to the additional mobile computing device(s), the app may be configured to cause the one or more processors of the first mobile computing device 116 to cause the mobile computing device 116 to begin operating in the beacon receive mode. Additionally, when the first mobile computing device 116 transmits such a signal to the additional mobile computing device(s), the app may be configured such that upon receipt of such a signal by the additional mobile computing device(s), the app as installed on the additional mobile computing device(s) causes the additional mobile computing device(s) to operate in the beacon transmit mode.

As will be apparent from the above description, and as should be appreciated with respect to all examples presented in this disclosure, various ones of the functions or operations shown in FIG. 3 are optional. Furthermore, the functions or operations shown in FIG. 3 (and each flow chart herein) may be performed in any suitable order, any desired number of times, and/or with any suitable variation to the particular order and/or combination shown so as to achieve a desired result, such as a desired manner of generating an indication of whether a crash of a vehicle (e.g., the vehicle 102) has occurred.

IV. EXAMPLE METHOD FOR PROVIDING POST-CRASH INFORMATION AFTER INDICATION THAT VEHICLE CRASH HAS OCCURRED

Figure 4:
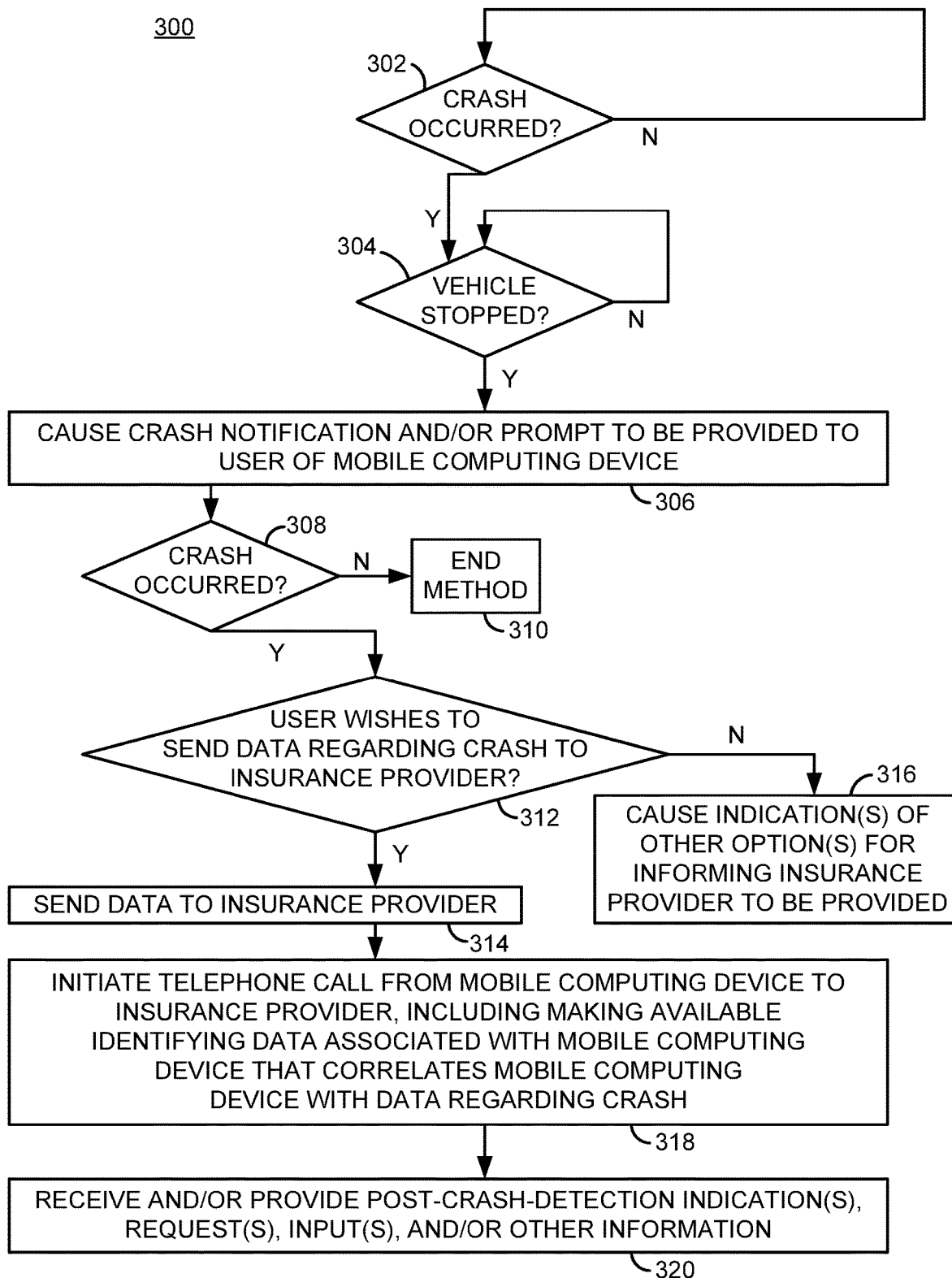
FIG. 4 is a flow chart of an example method, routine, or process for providing post-crash information after an indication that a vehicle crash has occurred.

FIG. 4 is a flow chart of an example method, routine, or process 300 for providing post-crash information after an indication that a vehicle crash has occurred. It will be appreciated from the teaching and disclosure below that various features of the example method, routine, or process 300 may be further features of the example method, routine, or process 200.

One or more processors, which may be one or more processors of the first mobile computing device 116, may determine whether the indication of whether the crash of the vehicle 102 has occurred (e.g., as described with respect to block 210) is an indication that the crash of the vehicle 102 has occurred (block 302). If it is determined that the indication of whether the crash of the vehicle 102 has occurred is an indication that the crash of the vehicle 102 has not occurred, the method 300 may remain at the determination described with respect to block 302 until it is determined that the indication of whether the crash of the vehicle 102 has occurred is an indication that the crash of the vehicle 102 has occurred.

If it is determined that the indication of whether the crash of the vehicle 102 has occurred is an indication that the crash of the vehicle 102 has occurred, the one or more processors may determine whether the vehicle 102 is stopped (block 304). For example, the one or more processors may use location information (e.g., GPS information) of the first mobile computing device 116 to determine whether the location of the first mobile computing device 116 is changing, and thus that the vehicle 102 is not stopped, or whether the location of the first mobile computing device 116 is not changing and thus the vehicle 102 is stopped. The one or more processors may perform any suitable additional or alternative actions to determine whether the vehicle 102 is stopped. If it is determined that the vehicle 102 is not stopped, the method 300 may remain at the determination described with respect to block 304 until it is determined that the vehicle 102 is stopped.

If it is determined that the vehicle 102 is stopped, the one or more processors may cause at least one of a notification of the crash of the vehicle 102 or a prompt associated with the crash of the vehicle 102 to be provided to the user (e.g., insured party such as the driver 112) of the first mobile computing device 116, such as via a user interface (e.g., display and/or other suitable user interface component(s)) of the first mobile computing device 116 (block 306). The notification and/or prompt may indicate that the first mobile computing device 116 has generated an indication that the crash of the vehicle 102 has occurred, and in some embodiments may prompt the user to confirm that the crash of the vehicle 102 has actually occurred or, alternatively, to indicate that the vehicle 102 has not been involved in a crash. For example, the base sensor data and/or the additional sensor data may represent a "false alarm" and thus indicate a crash when a crash has not actually occurred. Such a false alarm may occur if, for example, the first mobile computing device 116 is dropped while within the vehicle 102, or otherwise experiences a sudden movement and/or change in movement even though the vehicle 102 is not involved in a crash.

The one or more processors may determine whether the user has confirmed (e.g., via the user interface of the first mobile computing device 116) that the crash of the vehicle 102 occurred (block 308). If it is determined that the user has indicated that the crash of the vehicle 102 has not occurred, the method may end (block 310). If it is determined that the crash of the vehicle 102 has occurred (e.g., that the user has confirmed that the crash of the vehicle 102 has occurred), it may be determined whether the user wishes to send data regarding the crash of the vehicle 102 from the first mobile computing device 116 to the insurance provider (block 312). For example, the notification and/or prompt provided to the user may include an inquiry as to whether the user wishes to send the data regarding the crash to the insurance provider. The inquiry may be presented, for example, by way of an option on a touch screen display of the first mobile computing device 116. In one embodiment, the inquiry as to whether the user wishes to send the data regarding the crash to the insurance provider may be presented via the touch screen display after the user selects a previous option presented via the touch screen display to confirm that the crash has occurred, as discussed with respect to block 308.

If it is determined with respect to block 312 that the user wishes to send the data regarding the crash to the insurance provider, the one or more processors may send the data regarding the crash of the vehicle 102 to the insurance provider (block 314). For example, the one or more processors may cause the data regarding the crash of the vehicle 102 to be sent using at least a portion of an I/O circuit, such as the I/O circuit 170, to the remote computing device(s) 106 via the computer network 104. As further discussed below, the data regarding the crash of the vehicle 102 that is sent by the first mobile computing device 116 to the insurance provider may be used by the insurance provider to, for example, facilitate the initiation of a claim submission by the insured party without the insured party having to determine and provide such data to the insurance provider. In some embodiments, the data regarding the crash of the vehicle 102 may be used as discussed herein and the insured party may be asked, electronically or via phone, for example, to confirm aspects of the data regarding the crash of the vehicle 102 (e.g., that a crash occurred, a severity of the crash, a time of day, etc.) as received by the insurance provider. In some embodiments, the data regarding the crash of the vehicle 102 may also or alternatively be used by the insurance provider as part of a general process of determining correspondence between amounts of loss in claims and severity of vehicle crashes. The results of such determinations may be used, for example, by the crash detection app to improve determinations of indications of severity as described herein.

If it is determined with respect to block 312 that the user does not wish to send the data regarding the crash to the insurance provider, the one or more processors may cause one or more indications of one or more other options for informing the insurance provider of the crash of the vehicle 102 and, for example, initiating a claim with the insurance provider with respect to the crash, to be provided to the user of the first mobile computing device 116 (block 316). For example, the one or more processors may cause the first mobile computing device 116 to display, or otherwise provide via a user interface, one or more of a contact telephone number for the insurance provider; one or more contact addresses for the insurance provider; a list of information that should be provided to the insurance provider when initiating a claim with the insurance provider with respect to the crash; an option(s) to schedule a time for a claim representative of the insurance provider to contact the user, such as by providing one or more suitable touch screen options; and/or any other suitable information for initiating a claim with the insurance provider.

With continued reference to the actions performed when it is determined with respect to block 312 that the user wishes to send the data regarding the crash of the vehicle 102 from the first mobile computing device 116 to the insurance provider, as noted above with respect to block 314, the one or more processors may send such data to the insurance provider. With continued reference to the actions described with respect to block 314, in one embodiment, such data may be considered claim information and may be stored (e.g., in the database 108) for use in processing a claim when, for example, the user calls the insurance provider to proceed with claim processing, as further discussed below. In another embodiment, the data regarding the crash of the vehicle 102 may be stored (e.g., in the database 108) but may not be considered claim information. For example, the user may be asked to decide at a later time, such as when calling the insurance provider as described below, if the user wishes to submit a claim with respect to the crash of the vehicle 102, and if the user does wish to submit a claim, the stored data regarding the crash may then be considered claim information and may be used in processing the claim.

The one or more processors may initiate a telephone call from the first mobile computing device 116 to the insurance provider, such as via the computer network to the call management device(s) 110 (block 318). The initiating of the telephone call may include the one or more processors making available to the insurance provider identifying data associated with the first mobile computing device 116, where the identifying data associated with the first mobile computing device 116 may correlate the first mobile computing device 116 with the data regarding the crash of the vehicle 102. For example, the identifying data may be a telephone number of the first mobile computing device 116 where the first mobile computing device 116 is a smart phone, and may thus be made available automatically when the telephone call is initiated from the first mobile computing device 116 to the insurance provider. In another example, the identifying data may be an insurance policy number of the user of the first mobile computing device 116 (e.g., the insured party), and the one or more processors of the first mobile computing device 116 may cause the insurance policy number to be transmitted to the call management device(s) 110, for example, when the telephone call is initiated. Generally speaking, the identifying data associated with the first mobile computing device 116 may be any suitable data that correlates the first mobile computing device 116 with the data regarding the crash of the vehicle 102, and allows the insurance provider to determine that the data regarding the crash of the vehicle 102 corresponds to the first mobile computing device 116.

In one embodiment, when the telephone call is initiated, the call management device(s) 110 may perform a lookup of the identifying data made available to the insurance provider by communicating with, for example, one or more of the remote computing device(s) 106, such as an insurance provider server. For example, when the identifying data made available to the insurance provider is a telephone number of the first mobile computing device 116, the call management device(s) 110 may query the one or more of the remote computing device(s) 106, or otherwise communicate with the one or more of the remote computing device(s) 106, to match the telephone number with data regarding a vehicle crash. In some cases, the data regarding the vehicle crash may have been stored in the database 108, and the remote computing device(s) 106 may in turn query or otherwise communicate with the database 108 in response to the query or other communication from the call management device(s) 110. In other examples, the call management device(s) 110 may query or otherwise communicate with the database 108 instead of querying or otherwise communicating with the remote computing device(s) 106. The call management device(s) 110 may similarly communicate with the remote computing device(s) 106 or the database 108 when the identifying data made available to the insurance provider (e.g., transmitted to the call management device(s) 110) is data other than a telephone number, such as an insurance policy number as discussed above.

In any event, with continued reference to the actions described with respect to block 318, the data regarding a vehicle crash that corresponds to (correlates with) the first mobile computing device 116 (e.g., the data regarding the crash of the vehicle 102) may be retrieved from one or more of the remote computing device(s) 106 or from the database 108 using the identifying data made available to the insurance provider. If the data regarding the crash of the vehicle 102 is considered claim information, as discussed above, one or more of the call management device(s) 110, which may be located at a claim processing center of the insurance provider, may use such claim information to populate fields of a claim that may be shown on a computing device display to an employee or contractor of the insurance provider. For example, the fields of the claim may be populated using such claim information when an employee or contractor of the insurance provider answers the telephone call. Such claim information may include, for example, one or more of an indication of a time of the crash of the vehicle 102, an indication of a location (e.g., using GPS coordinates) of the crash of the vehicle 102, an indication of a severity of the crash of the vehicle 102, and/or any other suitable claim information.

With further reference to the actions described with respect to block 318, in examples where the data regarding the crash of the vehicle 102 is not considered claim information, as discussed above, the user may need to decide whether to submit a claim with regard to the crash of the vehicle 102 when the telephone call from the first mobile computing device 116 to the insurance provider is initiated. For example, the user may inform an employee or contractor of the insurance provider who answers the telephone call, or may inform an automated service that answers the telephone call, that the user wishes to submit a claim. The data regarding the crash of the vehicle 102 may then, for example, be populated into fields of a claim that may be shown on a computing device, or may otherwise be used to facilitate the claim process.

In some embodiments, the user (e.g., insured party such as the driver 112) may be requested to provide additional information to establish or complete a First Notice of Loss (FNOL). As such, the one or more processors may receive and/or provide one or more of a post-crash-detection indication(s) from and/or to the user (e.g., insured party) of the first mobile computing device 116; a post-crash-detection request(s) from and/or to the user; a post-crash-detection input(s) from the user; or any other suitable information from and/or to the user (block 320).

More particularly, in various embodiments, the one or more processors of the first mobile computing device 116 may at least one of receive an indication from the user of the first mobile computing device 116 of a severity of the crash of the vehicle 102; receive (e.g., from memory of the first mobile computing device 116) and provide to the user an indication of at least one of at least one individual or at least one entity for the user to contact regarding the crash of the vehicle (e.g., an emergency contact person, the insurance provider, etc.); receive an indication from the user (e.g., by way of a text message, such as in response to a prompt sent to the first mobile computing device 116 after the user confirms that the crash of the vehicle 102 has occurred) of whether any occupant of the vehicle has been injured in the crash of the vehicle 102; receive a request from the user for information regarding post-crash guidelines (e.g., suggestions regarding how to communicate with a driver of another vehicle involved in the crash, a reminder to get insurance information of the driver of the other vehicle involved in the crash, etc.) for the user to follow after the crash of the vehicle 102 and/or provide such information regarding post-crash guidelines to the user; receive an input from the user to adjust data regarding the crash of the vehicle 102 that is to be sent to the insurance provider (e.g., default text or other element(s) of an electronic communication to be sent to the insurance provider to provide data regarding the crash, such as the data regarding the crash as described with respect to blocks 312 and 314); receive a request from the user to view via a user interface of the first mobile computing device 116 one or more images of an insurance card corresponding to the insurance coverage associated with the vehicle 102; provide such one or more images of the insurance card via the user interface for viewing by the user; receive a request from the user for a tow truck to be deployed to a location of the crash of the vehicle 102; receive a request from the user for transportation of the user (e.g., as facilitated by the insurance provider) from the location of the crash of the vehicle 102; receive a request from the user for the insurance provider to arrange use of a rental vehicle for the user; receive an input from the user to initiate an electronic claim process to file a claim associated with the crash of the vehicle 102 with the insurance provider; receive an input from the user to initiate contact via the first mobile computing device 116 (e.g., by way of a telephone call) with an agent of the insurance provider; and/or receive and/or provide any other suitable and/or desired indication(s), request(s), input(s), or other information.

V. EXAMPLE SYSTEM FOR GENERATING VEHICLE CRASH DATA

FIG. 5 illustrates the example system 100 for generating vehicle crash data in greater detail. As shown in FIG. 5, the system 100 may include the vehicle 102, the computer network 104, the remote computing device(s) 106, the database 108, and the call management device(s) 110. The vehicle 102 is shown as including the driver seat 114, the front passenger seat 120, a left rear passenger seat 402, and a right rear passenger seat 404. In the example of FIG. 5, the first mobile computing device 116 may be associated with (e.g., possessed by) a driver (not shown in FIG. 5) sitting in the driver seat 114, and the second mobile computing device 122 may be associated with a passenger (not shown in FIG. 5) sitting in the front passenger seat 120. FIG. 5 also illustrates a third mobile computing device 406 and a fourth mobile computing device 408, which may be a smart watch. The third and fourth mobile computing devices 406 and 408 may be associated with occupants (not shown in FIG. 5) of the left rear passenger seat 402 and the right rear passenger seat 404, respectively.

As further illustrated in FIG. 5, the first, second, and third mobile computing devices 116, 122, and 406 may be communicatively coupled to the computer network 104 so as to communicate with, for example, the remote computing device(s) 106 and the call management device(s) 110 in a similar manner as discussed above with respect to, for example, the first mobile computing device 116. In one embodiment, the smart watch 408 may not directly communicate with the computer network 104 (e.g., the Internet) but may communicate with the computer network 104 indirectly by being communicatively coupled to another one of the computing devices, such as, for example, the first mobile computing device 116. With further reference to the discussion above, it will be appreciated that the configuration of computing devices and seats as shown in FIG. 5 is by way of example only. For example, the first, second, third, and fourth mobile computing devices 116, 122, 406, and 408 may be in different seats than shown in FIG. 5; the vehicle 102 may include more or fewer seats; the vehicle 102 may include more or fewer computing devices; and/or any other suitable modifications to the arrangement shown in FIG. 5 may be made.

FIG. 5 also illustrates communication links from each one of the mobile computing devices 116, 122, 406, and 408 to each other one of the mobile computing devices 116, 122, 406, and 408. Each such communication link may be any suitable wireless or wired communication link. It will be appreciated that not all of the communication links between the mobile computing devices 116, 122, 406, and 408 shown in FIG. 5 need be present in a particular embodiment. For example, a suitable subset of the communication links shown between the mobile computing devices 116, 122, 406, and 408 shown in FIG. 5 may be present in a particular embodiment. In some embodiments, the communication links between the mobile computing devices 116, 122, 406, and 408 may be or may include BLUETOOTH® communication links used in implementing a wireless ad hoc network in which each of the mobile computing devices 116, 122, 406, and 408 operates in a beacon receive mode or a beacon transmit mode, as discussed above and further discussed below.

In some embodiments, the remote computing device(s) 106 may include one or more insurance provider servers, as discussed above, and the one or more insurance provider servers may be or may include one or more cloud computing servers with which the mobile computing devices 116, 122, 406, and 408 may communicate via the computer network 104.

VI. EXAMPLE METHODS FOR GENERATING VEHICLE CRASH DATA

Figure 6:
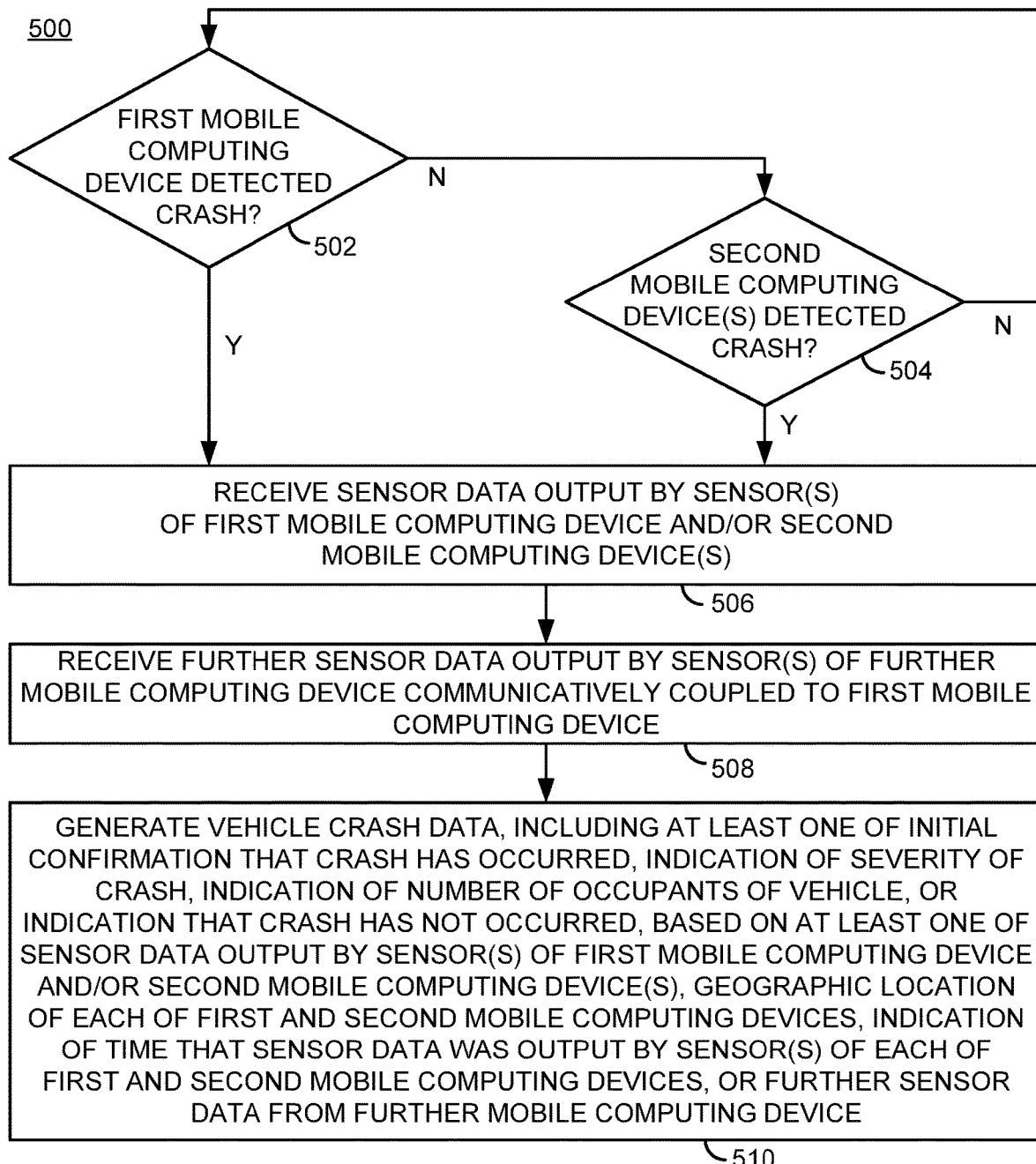
FIG. 6 is a flow chart of an example method, routine, or process for generating vehicle crash data.

FIG. 6 is a flow chart of an example method, routine, or process 500 for generating vehicle crash data, such as data regarding a crash of the vehicle 102. One or more processors may determine whether the first mobile computing device 116 within the vehicle 102 has detected that a crash of the vehicle 102 has occurred (block 502). In some embodiments, the one or more processors may be or may include one or more processors of the first mobile computing device 116. The determination of whether the first mobile computing device 116 has detected that a crash of the vehicle 102 has occurred may be made, for example, in the manner described above with respect to, for example, FIG. 3. In some embodiments, the one or more processors may also or alternatively be or include one or more processors of one or more of the remote computing device(s) 106. In such embodiments, the determination of whether the first mobile computing device 116 has detected that a crash of the vehicle 102 has occurred may include receiving, using the one or more processors of the one or more of the remote computing device(s) 106, an indication from the first mobile computing device 116 of whether the crash of the vehicle 102 has occurred. Such an indication may be determined, for example, in the manner described above with respect to FIG. 3.

If it is determined with respect to block 502 that the first mobile computing device 116 has not detected that a crash of the vehicle 102 has occurred, the one or more processors may determine whether at least a second mobile computing device (e.g., the second mobile computing device 122 and/or the third mobile computing device 406) within the vehicle 102 has detected that a crash of the vehicle 102 has occurred (block 504). For example, one or more processors of the first mobile computing device 116 may determine whether the first mobile computing device 116 has received an indication from the at least the second mobile computing device (e.g., one or more of the mobile computing devices 122 or 406) that the crash of the vehicle 102 has occurred. Such an indication may be determined by the at least the second mobile computing device in the manner described above with respect to FIG. 3, for example. In some embodiments, the one or more processors may also or alternatively be or include one or more processors of one or more of the remote computing device(s) 106, as discussed with respect to block 502. In such embodiments, the determination of whether the at least the second mobile computing device has detected that a crash of the vehicle 102 has occurred may include receiving, using the one or more processors of the one or more of the remote computing device(s) 106, an indication from the at least the second mobile computing device of whether the crash of the vehicle 102 has occurred. As discussed above, such an indication may be determined, for example, in the manner described with respect to FIG. 3.

If it is determined with respect to block 504 that the at least the second mobile computing device has not detected that a crash of the vehicle 102 has occurred, the method 500 may return to the determination as described with respect to the block 502, and thus the method 500 may not proceed past the determinations described with respect to blocks 502 and 504 until it is determined that at least one of the first or the at least the second mobile computing devices has detected that a crash has occurred. Conversely, if it is determined with respect to either block 502 or block 504 that the first mobile computing device 116 (block 502) or the at least the second mobile computing device (block 504) has detected that a crash of the vehicle 102 has occurred, the one or more processors may receive sensor data output by at least one sensor (block 506). More particularly, with continued reference to the actions described with respect to block 506, the at least one sensor may be at least one sensor of at least one of the first mobile computing device 116 or the at least the second mobile computing device. The sensor data output by the at least one sensor of the at least one of the first mobile computing device 116 or the at least the second mobile computing device may be associated with the detected crash of the vehicle 102 (e.g., by being sensor data output at a time that matches a time of the detected crash of the vehicle 102).

The one or more processors may receive further sensor data output by at least one sensor of a further mobile computing device (e.g., the fourth mobile computing device 408, which as noted above may be a smart watch, for example) (block 508). The at least one further sensor may include at least one sensor of the types of sensors 152-160 discussed with respect to the computing device 150, for example. The further mobile computing device may be communicatively coupled to the first mobile computing device 116 (e.g., by way of the fourth mobile computing device 408 being communicatively coupled, such as via BLUETOOTH® communication, to the first mobile computing device 116), and the further sensor data may be associated with the detected crash of the vehicle 102 (e.g., by being sensor data output at a time that matches a time of the detected crash of the vehicle 102). In some embodiments, the further sensor data may be used in generating vehicle crash data as described below. As discussed above with reference to the actions described with respect to blocks 502 and 504, the one or more processors may be or may include one or more processors of, for example, the first mobile computing device 116 and/or one or more of the remote computing device(s) 106, and the further sensor data may be received accordingly. For example, in an embodiment where the one or more processors include one or more processors of one or more of the remote computing device(s) 106 (such as one or more processors of a cloud computing device of the insurance provider), and where the further mobile computing device is communicatively coupled to the first mobile computing device 116, the one or more processors may receive the further sensor data from the first mobile computing device 116.

The one or more processors (which, again, may be or may include one or more processors of, for example, the first mobile computing device 116 and/or one or more of the remote computing device(s) 106) may generate the vehicle crash data (block 510). More particularly, with continued reference to the actions described with respect to block 510, the one or more processors may generate the vehicle crash data based on the sensor data associated with the detected crash of the vehicle 102 as output by the at least one sensor of the at least one of the first mobile computing device 116 or the at least the second mobile computing device. For example, by analyzing such sensor data, the one or more processors may generate the vehicle crash data so that the vehicle crash data includes at least one of an initial confirmation that the crash of the vehicle 102 has occurred, an indication of a severity of the crash of the vehicle 102, an indication of a number of occupants of the vehicle 102 at a time of the crash, or an indication that the crash of the vehicle 102 has not occurred.

With continued reference to the actions described with respect to block 510, in one embodiment, the first mobile computing device 116 or one or more of the at least the second mobile computing device may have detected that the crash of the vehicle 102 has occurred, and sensor data received from another mobile computing device(s) of the first and/or second mobile computing device(s) as described with respect to block 508 may provide a confirmation that the crash has occurred or, conversely, may provide an indication that the crash has not actually occurred. In one embodiment, where any of the first mobile computing device 116 or the at least the second mobile computing device detects that the crash of the vehicle 102 has occurred, as described with respect to blocks 502 and 504, a subsequent indication that the crash has not actually occurred as described with respect to block 510 may be used by the mobile computing device(s) that detected the crash in, for example, a machine learning process as described above. Such use in a machine learning process, for example, may improve the accuracy of crash detection, severity classification, etc. by the mobile computing device(s) that detected the crash.

With further reference to the actions described with respect to block 510, in some embodiments, the one or more processors may additionally or alternatively generate the vehicle crash data based on, for each one of the first mobile computing device 116 and/or the at least the second mobile computing device, at least one of (i) a respective geographic location of the mobile computing device (e.g., as determined by a GPS unit of the mobile computing device), or (ii) a respective indication of a time (e.g., as determined by the mobile computing device) that at least a portion of the sensor data output by the at least one sensor of the at least one of the first mobile computing device 116 or the at least the second mobile computing device was output by at least one sensor of the respective mobile computing device. In this manner, the vehicle crash data may be generated based on collating sensor data from different ones of the mobile computing devices based on indicated geographic locations and/or times at which the sensor data of the different mobile computing devices was output.

Among other advantages, generation of the vehicle crash data in this manner may be more likely to accurately account for differences in sensor outputs among the mobile computing devices (e.g., the mobile computing devices 116, 122, and 406) based on a subset of the mobile computing devices being relatively farther apart from one another as compared to another subset of the mobile computing devices. Additionally or alternatively, among other advantages, if, for example, one of the mobile computing devices 116, 122, or 406 outputs sensor data at an indicated time that is different from indicated times at which the others of the mobile computing devices 116, 122, or 406 output sensor data, the sensor data output by the one of the mobile computing devices may be treated with relatively lower importance or weight in the analysis of the sensor data and generation of the vehicle crash data.

More generally, use of sensor data from multiple mobile computing devices as described herein may improve the accuracy of the vehicle crash data even without use of indicated geographic locations and/or times at which the sensor data of different ones of the multiple mobile computing devices was output. For example, a mobile computing device, such as a smart phone, may experience significant movement unrelated to any vehicle crash, such as if the mobile computing device is dropped, moved suddenly by a user from one hand to another, picked up or put down by the user, re-oriented by the user, etc. By using sensor data from multiple mobile computing devices in the vehicle 102, sensor data that may correspond to sensor data present when a crash occurs but that does not actually reflect a crash may have less influence on the generated vehicle crash data, because sensor data from another mobile computing device(s) in the vehicle 102 is relatively unlikely to correspond to sensor data present when a crash occurs unless a crash has actually occurred. Additionally, the use of multiple mobile computing devices as described herein may improve aspects of the vehicle crash data such as the indicated severity, indicated number of occupants, etc. by providing more sensor data upon which to base such indications. Still further, the use of multiple mobile computing devices as described herein may improve accuracy of the vehicle crash data by providing sensor data from one or more mobile computing devices that may have more sensitive sensors (e.g., the first mobile computing device 116) to augment sensor data from one or more mobile computing devices that may, for example, be less expensive and/or incorporate older technology and thus have less sensitive sensors, for example (e.g., the second mobile computing device 122).

With still further reference to the actions described with respect to block 510, in some embodiments, the one or more processors may additionally or alternatively generate the vehicle crash data based on the further sensor data. As such, sensor data from, for example, the fourth mobile computing device 408 (e.g., a smart watch) may also be utilized in generating the vehicle crash data, even in examples such as that shown in FIG. 5 where the further (e.g., fourth) mobile computing device communicates with the computer network 104 indirectly through one of the first, second, or third mobile computing devices 116, 122, or 406.

Figure 7:
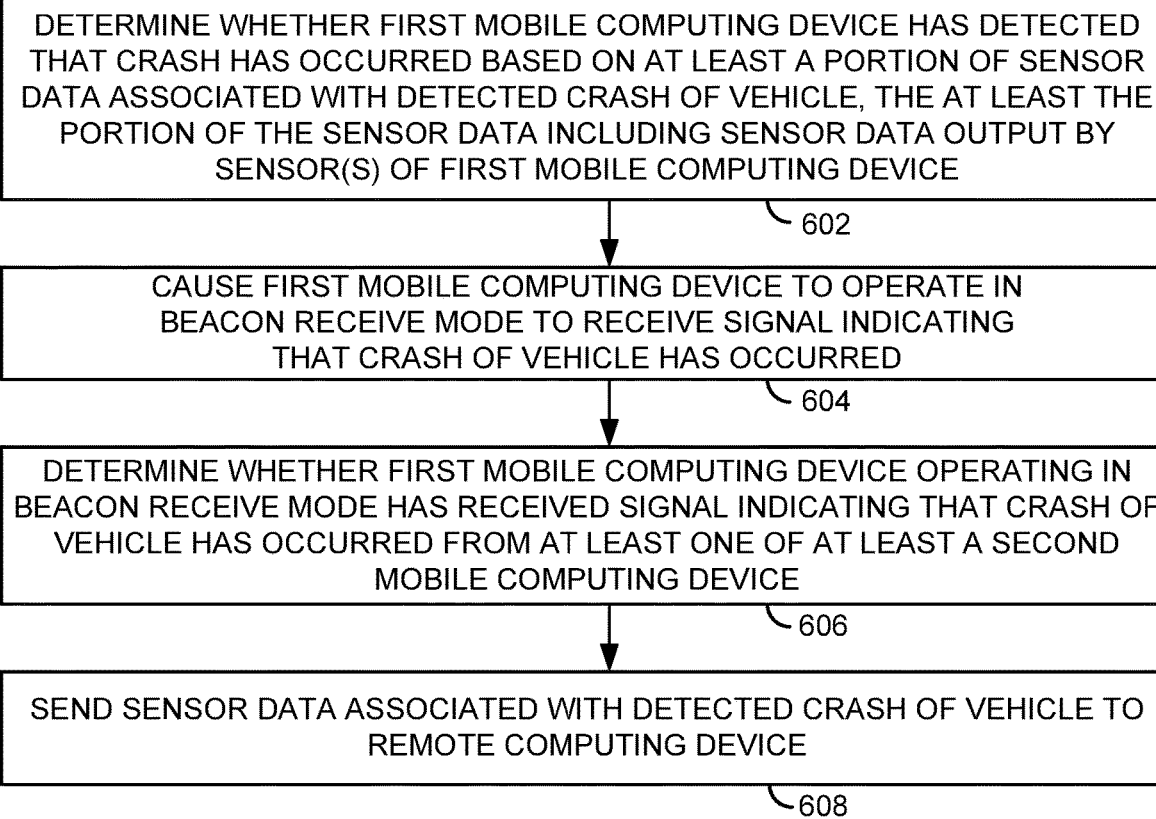
FIG. 7 is a flow chart of another example method, routine, or process for generating vehicle crash data.

FIG. 7 is a flow chart of another example method, routine, or process 600 for generating vehicle crash data, such as data regarding a crash of the vehicle 102. It will be appreciated from the teaching and disclosure herein that actions described with respect to the example method, routine, or process 600 of FIG. 7 may constitute particular implementations of actions described with respect to the example method, routine, or process 500 of FIG. 6.

One or more processors may determine whether the first mobile computing device 116 within the vehicle 102 has detected that a crash of the vehicle 102 has occurred based on at least a portion of the sensor data output by the at least one sensor of the at least one of the first mobile computing device 116 or the at least the second mobile computing device, where the at least the portion of such sensor data includes sensor data output by at least one sensor of the first mobile computing device 116 (block 602). It will be appreciated that the actions described with respect to block 602 may correspond to a more particular implementation of the actions described with respect to block 502 of FIG. 6. Additionally, in various embodiments, the one or more processors may be or may include one or more processors of the first mobile computing device 116 and/or one or more processors of one or more of the remote computing device(s) 106, for example.

The one or more processors may cause the first mobile computing device 116 to operate in a beacon receive mode to receive a signal indicating that the crash of the vehicle 102 has occurred (block 604). With reference to the discussion above, in some embodiments, the first mobile computing device 116 may be caused to operate in the beacon receive mode after it is determined that the first mobile computing device 116 has detected that the crash of the vehicle 102 has occurred. For example, with reference to the discussion of FIG. 3 above, the first mobile computing device 116 may in some embodiments transmit a signal indicating that base sensor data received by one or more processors of the first mobile computing device 116 indicates that a condition corresponding to a crash has occurred, and the signal may be received by, for example, the second, third, and fourth mobile computing devices 122, 406, and 408. In other embodiments, the first mobile computing device 116 may transmit such a signal when the first mobile computing device 116 has detected a crash of the vehicle 102 (e.g., when the one or more processors generate an indication that the crash has occurred based on, for example, additional sensor data associated with the first mobile computing device 116 as described above). In such embodiments, the signal may be received by, for example, the second, third, and fourth mobile computing devices 122, 406, and 408. In some embodiments, when the first mobile computing device 116 transmits such a signal, the one or more processors may cause the first mobile computing device 116 to begin operating in the beacon receive mode, as further discussed above with respect to FIG. 3. With further reference to the discussion of FIG. 3, upon receipt of such a signal, the second, third, and fourth mobile computing devices 122, 406, and 408 may be caused to operate in a beacon transmit mode.

With continued reference to the actions described with respect to block 604, the mobile computing devices 116, 122, 406, and 408 may thus form a wireless ad hoc network using, for example, BLUETOOTH® communication with the first mobile computing device 116 operating in a beacon receive mode after detecting a crash or a crash condition, and with the remaining mobile computing devices operating in a beacon transmit mode. It will be appreciated, however, that any suitable ad hoc network may be formed, which may or may not utilize BLUETOOTH® communication, and/or which may or may not include the mobile computing devices 116, 122, 406, and 408 operating in beacon receive and beacon transmit modes such as described above. It will further be appreciated that while the first mobile computing device 116 is at times described herein as detecting the crash of the vehicle 102 or the crash condition, in various embodiments, each of the mobile computing devices 116, 122, 406, and 408 may detect the crash of the vehicle 102 at any time. In such embodiments, for example, the one of the mobile computing devices 116, 122, 406, or 408 that detects the crash of the vehicle 102 first may perform the actions described herein as being performed by the first mobile computing device 116 (e.g., operating in a beacon receive mode or otherwise "listening for" or receiving one or more signals from the other mobile computing devices indicative of detection of the crash of the vehicle 102).

The one or more processors may determine whether the first mobile computing device 116 operating in the beacon receive mode has received the signal indicating that the crash of the vehicle 102 has occurred from at least one of the at least the second mobile computing device (e.g., at least one of the second mobile computing device 122 or the third mobile computing device 406) (block 606). In this manner, the mobile computing device (e.g., the first mobile computing device 116) that first detects that the crash of the vehicle 102 has occurred may determine whether other nearby devices have also detected that the crash of the vehicle 102 has occurred. As described with respect to block 604, in other embodiments, the first mobile computing device 116 may communicate with the mobile computing devices 122, 406, and/or 408, for example, in any suitable wireless ad hoc network, which need not utilize beacon transmit and beacon receive modes and/or which need not utilize BLUETOOTH® communication.

With continued reference to the actions described with respect to block 606, and as discussed above with respect to FIG. 6, the combination of data from multiple mobile computing devices regarding whether the crash of the vehicle 102 has been detected may improve the accuracy of the vehicle crash data generated by, for example, the first mobile computing device 116. Thus, for example, the first mobile computing device 116 may detect a crash, but no other mobile computing device may detect a crash, and the vehicle crash data generated by the first mobile computing device 116 may indicate that no crash actually occurred (with such vehicle crash data depending, for example, upon factors such as geographic location and/or times of sensor outputs). In this example, the first mobile computing device 116 may be caused (e.g., by the aforementioned app executed by the one or more processors) to change, for example, the manner in which the first mobile computing device 116 analyzes sensor data to detect whether the crash of the vehicle 102 has occurred, and thus may provide more accurate detection data for use in ultimately generating the vehicle crash data as described herein. With reference to the discussion of FIG. 6, such changing of the manner in which the first mobile computing device 116 analyzes, for example, sensor data may result from, for example, a machine learning process implemented using the first mobile computing device 116.

With further reference to the actions described with respect to block 606, it will also be appreciated that grouping or collating of data from mobile computing devices based on geographic location and/or times of sensor outputs, such as in the manner discussed above with respect to FIG. 6, may accurately account for differences in sensor outputs among the mobile computing devices. Furthermore, when two mobile computing devices have an existing relationship other than a wireless ad hoc network, such as the fourth mobile computing device 408 (e.g., a smart watch) being communicatively coupled to the first mobile computing device 116, sensor data output by each of such two mobile computing devices (e.g., the fourth mobile computing device 408 and the first mobile computing device 116) may be compared. In this manner, for example, the accuracy of generating the vehicle crash data may be further increased by assessing related sensor data from multiple perspectives.

It will be appreciated in light of the teaching and disclosure herein that actions described with respect to blocks 604 and 606 may correspond to implementations of the actions described with respect to block 504.

The one or more processors may also send the sensor data output by the at least one sensor of the at least the first mobile computing device 116 or the at least the second mobile computing device to one or more of the remote computing device(s) 106 (block 608). For example, one or more processors of the first mobile computing device 116 may send such sensor data to a cloud computing device (e.g., cloud computing server) of the insurance provider, which cloud computing device may be one of the remote computing device(s) 106. As noted above, the one or more processors may include one or more processors of one or more of the remote computing device(s) 106, and as such may include one or more processors of such a cloud computing device. Consequently, in some embodiments, the aforementioned sensor data may be analyzed by one or more processors of such a cloud computing device, and the one or more processors of such a cloud computing device may perform the generation of the vehicle crash data as described with respect to, for example, block 510 of FIG. 6.

VII. EXAMPLE COMPUTING DEVICE FOR GENERATING DATA REGARDING A VEHICLE CRASH

Figure 8:
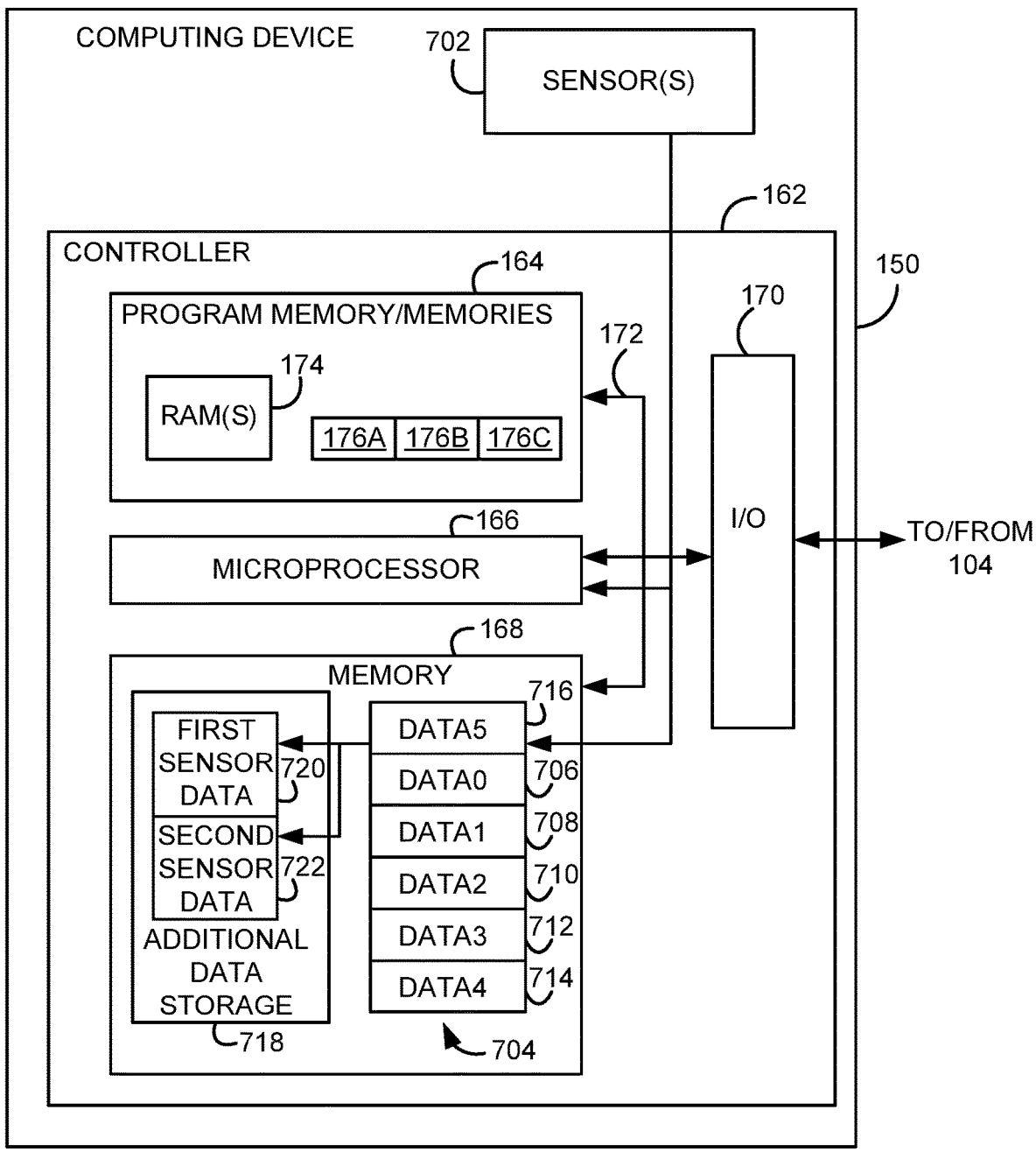
FIG. 8 illustrates an implementation of the example computing device of FIG. 2 and components thereof that may be used in generating data regarding a vehicle crash.

FIG. 8 illustrates an implementation of the example computing device 150 and components thereof that may be used in generating data regarding a vehicle crash, such as a crash of the vehicle 102 as described herein. As described with respect to FIG. 2, an instance or instances of the computing device 150, or portions thereof, may be an implementation(s) of any suitable computing device such as, for example, one or more of the first, second, third, or fourth mobile computing devices 116, 122, 406, or 408. As shown in FIG. 8, the computing device 150 may include one or more sensors 702, which may be or may include, for example, any suitable one or more of the sensors 152-160 described above with respect to FIG. 2. The remaining description of the computing device 150 with respect to FIG. 8 will include description of components not also shown in FIG. 2, it being understood that the components shown in FIG. 8 and also shown in FIG. 2 may be configured and/or may operate in the manner described with respect to FIG. 2.

As shown in FIG. 8, the computing device 150 may include a buffer 704, where the buffer may be a suitable portion of the memory 168 that includes, for example, data 706-716. In one embodiment, before a crash of the vehicle 102 is detected, the data 706-716 may include, for example, initial sensor data output by at least one sensor of a mobile computing device (e.g., the first mobile computing device 116) of which the computing device 150 is an implementation. In particular, first data 706 may be a first received element of the initial sensor data output by the sensor(s) of the first mobile computing device 116 and, as shown in FIG. 8, is designated "DATA0." Second data 708 may be a second received element of the initial sensor data output by the sensor(s) and may be designated "DATA1." Third data 710 may be a third received element of the initial sensor data output by the sensor(s) and may be designated "DATA2." Fourth data 712 may be a fourth received element of the initial sensor data output by the sensor(s) and may be designated "DATA3." Fifth data 714 may be a fifth received element of the initial sensor data output by the sensor(s) and may be designated "DATA4." Sixth data 716 may be a sixth received element of the initial sensor data output by the sensor(s) and may be designated "DATA5."

In some embodiments, the buffer 704 may be a first-in first-out (FIFO) buffer. Additionally or alternatively, in some embodiments, the buffer 704 may be implemented as a circular buffer. As such, if a next (e.g., seventh) element of initial sensor data (e.g., sensor data output by the sensor(s) of the first mobile computing device 116 that includes the buffer 704) is received at the buffer 704, such a seventh element of initial sensor data, which may be designated "DATA6" may be written into the buffer 704 as the first data 706, and may overwrite the first received element of the initial sensor data designated as "DATA0." That is, the first received element "DATA0," which in this example is the oldest (e.g., earliest received) element of data, may be removed from the buffer 704 to make room for the seventh received element "DATA6." Similarly, if an eighth element of initial sensor data, which may be designated "DATA7," is received at the buffer 704, the eighth element may be written into the buffer 704 as the second data 708, and may overwrite the second received element "DATA1," which would at the time of receipt of the eighth element be the oldest element of data remaining in the buffer 704.

It will be appreciated in light of the teaching and disclosure herein that the buffer 704 may be of any suitable size (e.g., may include storage space for any suitable number of data elements, such as more than or less than six elements). As further described below with respect to FIG. 9, the contents of the buffer 704 may be stored in additional data storage 718 (e.g., as first sensor data 720 within the additional data storage 718) within the memory 168 when a crash of the vehicle 102 is detected, and the buffer 704 may then receive post-crash sensor data. The post-crash sensor data, as further described below, may also be stored in the additional data storage 718 (e.g., as second sensor data 722 within the additional data storage 718) to generate, for example, a file containing sensor data from both before and after the detected crash of the vehicle 102.

VIII. EXAMPLE METHOD FOR GENERATING DATA REGARDING A VEHICLE CRASH

Figure 9:
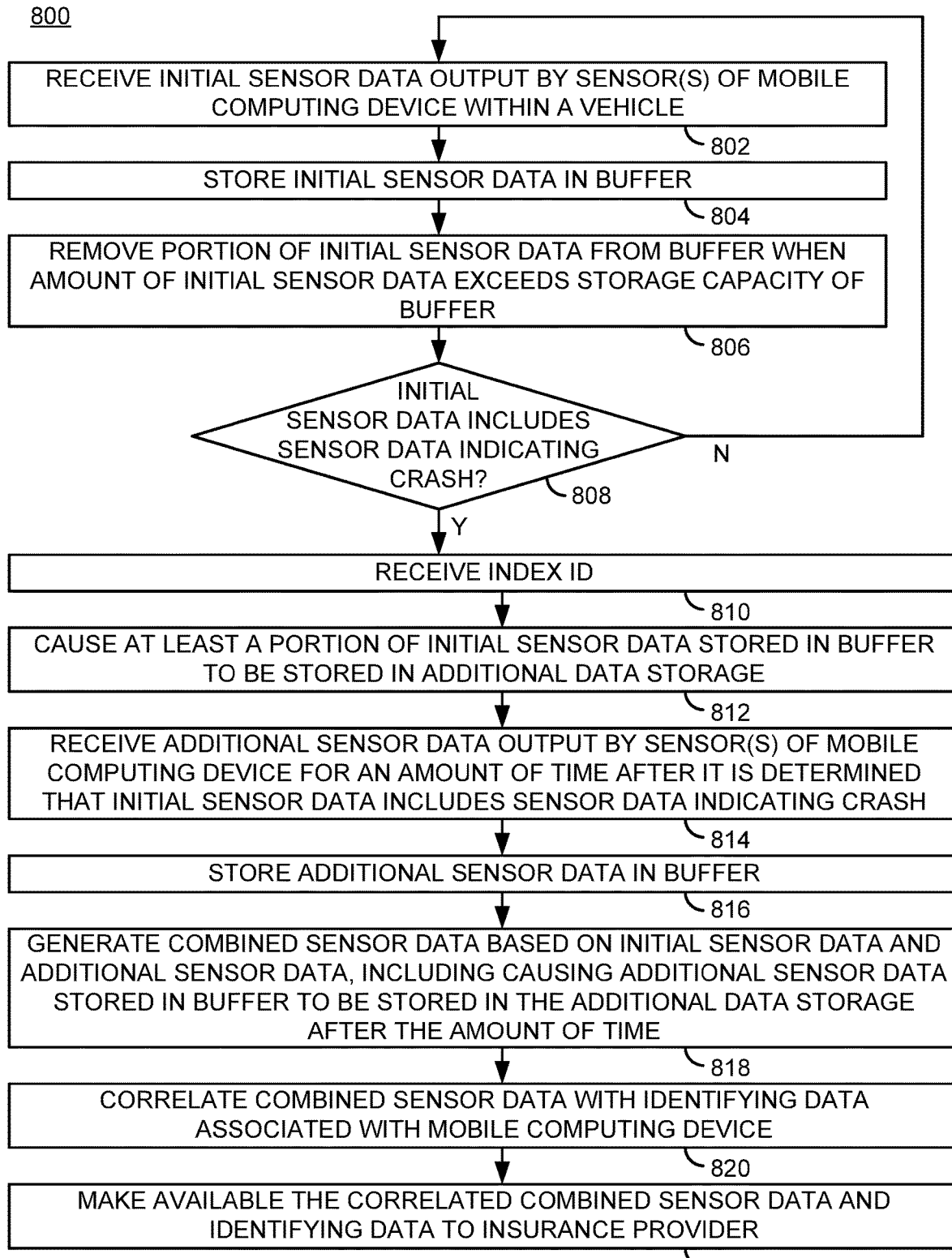
FIG. 9 is a flow chart of an example method, routine, or process for generating data regarding a vehicle crash.

FIG. 9 is a flow chart of an example method, routine, or process 800 for generating data regarding a vehicle crash, such as a crash of the vehicle 102 as described herein. One or more processors, which may be one or more processors of the first mobile computing device 116, such as a microprocessor(s) implemented as shown and described with respect to FIGS. 2 and 8, may receive initial sensor data output by at least one sensor of a mobile computing device (e.g., the first mobile computing device 116), such as initial sensor data output by at least one sensor of the types of sensors 152-160 (block 802).

The one or more processors may store the initial sensor data in the buffer 704, where as discussed above, the buffer 704 may be included in the first mobile computing device 116 (block 804). In one embodiment, the buffer 704 may include storage capacity for a first amount of sensor data (e.g., six elements of sensor data as shown in the example of FIG. 8). In another embodiment, the buffer 704 may include storage capacity for the lower of a second amount of sensor data (which may be any suitable amount of sensor data, and may be the same as or different from the first amount of sensor data) or an amount of sensor data that corresponds to a particular amount of time (e.g., a predetermined amount of time of collection of sensor output(s)).

In any event, the initial sensor data stored in the buffer 704 as described with respect to block 804 may in some embodiments be regarded as including first and second portions. The one or more processors may remove a portion of the initial sensor data (e.g., the second portion) from the buffer 704 when an amount of the initial sensor data exceeds a storage capacity of the buffer 704 (e.g., exceeds six elements of sensor data) (block 806). Thus, the second portion of the initial sensor data may be the oldest initial sensor data in the buffer 704, which may be removed from the buffer 704 (e.g., discarded, overwritten, etc.) when newer initial sensor data is stored in the buffer 704 and the buffer 704 no longer has storage capacity for the oldest initial sensor data. Correspondingly, the first portion of the initial sensor data may be regarded as the newest initial sensor data (e.g., that portion of the initial sensor data that is not the oldest initial sensor data that is removed from the buffer 704 as described above).

The one or more processors may determine whether the initial sensor data output by the at least one sensor of the mobile computing device (e.g., the first mobile computing device 116) and stored in the buffer 704 includes sensor data indicating that a crash of the vehicle 102 has occurred (block 808). In some embodiments, each element of sensor data stored in the buffer 704 may include data from multiple sensors of the first mobile computing device 116, such as each of the sensors 152-160 when each of the sensors 152-160 is outputting sensor data (as discussed with respect to, for example, FIGS. 1 and 3). The determination of whether the initial sensor data output by the at least one sensor of the mobile computing devices indicates that a crash of the vehicle 102 has occurred may be made in any suitable manner, such as by any suitable analysis of the initial sensor data in the buffer 704, which may include real-time analysis of the initial sensor data as the initial sensor data is received at and stored in the buffer 704. For example, the determination of whether the initial sensor data indicates that a crash of the vehicle 102 has occurred may be made in a similar manner as discussed above with respect to, for example, FIG. 3.

If it is determined with respect to block 808 that the initial sensor data does not indicate that a crash of the vehicle 102 has occurred, the method 800 may return to the actions described with respect to block 802 to continue receiving initial sensor data and performing the actions described with respect to blocks 804, 806, and/or 808 until it is determined that the initial sensor data indicates that a crash of the vehicle 102 has occurred. When it is determined with respect to block 808 that the initial sensor data indicates that a crash of the vehicle 102 has occurred, the one or more processors may receive an "index identifier" ("index ID") indicating a particular sensor that provided a sensor output(s) leading to the determination described with respect to block 808 that the initial sensor data indicates that a crash has occurred (block 810). In another embodiment, multiple "index IDs" indicating multiple sensors may be received when multiple sensors of, for example, the first mobile computing device 116 provided sensor outputs leading to the determination described with respect to block 808 that the initial sensor data indicates that a crash has occurred.

The one or more processors may cause at least a portion of the initial sensor data stored in the buffer 704 to be stored in the additional data storage 718 of the first mobile computing device 116 (block 812). For example, the at least the portion of the initial sensor data may be the first portion of the initial sensor data described above, and thus may be the newest initial sensor data, with the oldest initial sensor data (e.g., the second portion of the initial sensor data) having not indicated that a crash has occurred and having been removed/discarded from the buffer 704 as described above. More particularly as to the actions described with respect to block 812, the one or more processors may cause the at least the portion of the initial sensor data stored in the buffer 704 to be removed from the buffer 704 and stored as the first sensor data 720 within the additional data storage 718, where the first sensor data 720 thus is or includes sensor data corresponding to a period of time before the crash of the vehicle 102.

The one or more processors may receive additional sensor data output by the at least one sensor of the mobile computing device (e.g., the first mobile computing device 116) for an amount of time after it is determined that the initial sensor data output by the at least one sensor of the mobile computing device includes sensor data indicating that the crash of the vehicle 102 has occurred (block 814). The amount of time may be a predetermined amount of time corresponding to an expected duration of the crash of the vehicle 102, in some examples. For example, an expected duration of a vehicle crash in general may be three-tenths of a second, and thus the amount of time during which the additional sensor data is received may be, in various embodiments, three-tenths of a second, a suitable amount of time longer than three-tenths of a second to provide a margin of error, etc. In one embodiment, the additional sensor data may be received for the amount of time by the one or more processors computing or otherwise determining an end time at which the one or more processors may stop receiving the additional sensor data, where the end time may be based on a current time plus the amount of time during which the additional sensor data is to be received. The one or more processors may then receive the additional sensor data until the computed or otherwise determined end time.

The one or more processors may store the additional sensor data output by the at least one sensor of the first mobile computing device 116 in the buffer 704 (block 816). In view of the discussion above of the at least the portion of the initial sensor data (e.g., the first portion of the initial sensor data) being removed from the buffer 704 and stored as the first sensor data 720 within the additional data storage 718, the buffer 704 may be empty at the time the additional sensor data begins to be stored in the buffer 704. As also noted above, the buffer 704 may have one of several possible example storage capacities to store the additional sensor data.

The one or more processors may generate combined sensor data based on the initial sensor data stored as the first sensor data 720 and based on the additional sensor data (block 818). Generating the combined sensor data may include causing, such as at the aforementioned end time, the additional sensor data to be stored in the additional data storage 718 as the second sensor data 722, where the second sensor data 722 may thus correspond to a period of time after the crash of the vehicle 102. As such, in some embodiments, the combined sensor data may include the first sensor data 720 and the second sensor data 722.

The one or more processors may correlate the combined sensor data with identifying information associated with the mobile computing device (e.g., a telephone number of the first mobile computing device 116, an insurance policy number of a user (e.g., insured party) of the first mobile computing device 116, or any suitable identifying information) (block 820). The one or more processors may also make available the correlated combined sensor data and identifying data associated with the mobile computing device to the insurance provider (block 822). For example, such data may be sent to the insurance provider (e.g., to one or more of the remote computing device(s) 106) in the same or a similar manner as described above with respect to sending data regarding the detected crash to the insurance provider (e.g., as described with respect to FIG. 4). Thus, as also described above, information may be populated into a claim or otherwise be more readily accessible to the insurance provider if the user of the first mobile computing device 116, for example, initiates a claim regarding the crash electronically, by a telephone call to the insurance provider, etc.

It will be appreciated in light of the teaching and disclosure herein that the combined sensor data may have other suitable uses as well. As just one example, the second sensor data 722 may be compared with the first sensor data 720 and information such as differences between the first and second sensor data 720 and 722 (and if desired, one or more sensor-specific differences) may be used in a machine learning process such as that described above, may be used to improve severity classification and thus to improve indications of severity that are determined as described herein, and/or may be used in any other suitable manner.

IX. ADDITIONAL CONSIDERATIONS

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the first mobile computing device 116, one or more of the remote computing device(s) 106, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the first mobile computing device 116, one or more of the remote computing device(s) 106, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for generating vehicle crash data. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for generating vehicle crash data, the method comprising:
   determining, using one or more processors of a first mobile computing device, whether sensor data output of a sensor of the first mobile computing device within a vehicle indicates that a crash of the vehicle has occurred;
   in response to determining that the sensor data output indicates that the crash has occurred, operating, using the one or more processors, in a beacon receive mode;
   in response to determining that the sensor data output indicates that the crash has occurred, while operating in the beacon receive mode, listening, by the one or more processors, for signals from other mobile computing devices;
   while operating in the beacon receive mode, receiving, using the one or more processors, a signal from a second mobile computing device indicating that the crash has occurred;
   displaying, using the one or more processors, in response to (i) determining that the sensor data output indicates that the crash of the vehicle has occurred and (ii) receiving the signal, a notification prompting a user of the first mobile computing device to confirm that the crash of the vehicle has occurred;
   receiving, using the one or more processors, an indication from the user that the crash of the vehicle has occurred;
   transmitting, using the one or more processors, the sensor data output to a remote computing device associated with an insurance provider;
   receiving, using the one or more processors, a communication from the remote computing device.

2. The method of claim 1, wherein determining whether the sensor data output indicates that the crash of the vehicle has occurred further comprises determining whether the vehicle is stopped.

3. The method of claim 1, wherein the signal includes sensor data collected by the second mobile computing device indicating that the crash of the vehicle has occurred.

4. The method of claim 1, further including prompting, using the one or more processors, the user to approve a transmission of the sensor output data to the insurance provider before transmitting the sensor data output to the remote computing device.

5. The method of claim 1, further comprising displaying, using the one or more processors, the communication to the user via a user interface of the first mobile computing device.

6. The method of claim 1, wherein the communication prompts the user to initiate an insurance claim.

7. The method of claim 6, further comprising transmitting, using the one or more processors, a request to the remote computing device to initiate the insurance claim.

8. The method of claim 1, wherein the communication prompts the user to communicate with a driver of a different vehicle involved in the crash.

9. The method of claim 8, wherein the communication further prompts the user to obtain insurance information of the driver of the different vehicle.

10. The method of claim 1, wherein the communication prompts the user to request at least one of a towing service or a transportation service for the user, and wherein the method further comprises transmitting, using the one or more processors, a request to the remote computing device requesting the at least one of the towing service or the transportation service for the user.

11. The method of claim 1, wherein the communication prompts the user to provide additional information to the insurance provider in order to at least one of establish or complete a First Notice of Loss (FNOL).

12. The method of claim 1, further including transmitting, using the one or more processors, an indication of whether an occupant of the vehicle has been injured to the remote computing device.

13. A computing system for generating vehicle crash data, the computing system comprising:
   a first mobile computing device within a vehicle comprising one or more processors;
   at least one sensor of the first mobile computing device;
   wherein the first mobile computing device is configured to:
      determine whether sensor data output of the at least one sensor of the first mobile computing device indicates that a crash of the vehicle has occurred;
      in response to determining that the sensor data output indicates that the crash has occurred, operate in a beacon receive mode;

in response to determining that the sensor data output indicates that the crash has occurred, while operating in the beacon receive mode, listen for signals from other mobile computing devices;

while operating in the beacon receive mode, receive a signal from a second mobile computing device indicating that the crash has occurred;

display, in response to (i) determining that the sensor data output indicates that the crash of the vehicle has occurred and (ii) receiving the signal, a notification prompting a user of the first mobile computing device to confirm that the crash of the vehicle has occurred;

receive an indication from the user that the crash of the vehicle has occurred;

transmit the sensor data output to a remote computing device associated with an insurance provider;

receive a communication from the remote computing device.

14. The system of claim 13, wherein the signal includes sensor data collected by the second mobile computing device indicating that the crash of the vehicle has occurred.

15. The system of claim 13, wherein the first mobile computing device is further configured to display, to the user, a request for approval of a transmission of the sensor output data to the insurance provider before transmitting the sensor data output to the remote computing device.

16. The system of claim 13, wherein the first mobile computing device is further configured to display the communication to the user via a user interface of the mobile computing device.

17. The system of claim 13, wherein the communication prompts the user to initiate an insurance claim.

18. The system of claim 17, wherein the first mobile computing device is further configured to transmit a request to the remote computing device to initiate the claim.

19. The system of claim 13, wherein the communication prompts the user to communicate with a driver of a different vehicle involved in the crash and to obtain insurance information of the driver of the different vehicle.

* * * * *